(12) United States Patent
Leitner

(10) Patent No.: US 7,367,574 B2
(45) Date of Patent: May 6, 2008

(54) DRIVE SYSTEMS FOR RETRACTABLE VEHICLE STEP

(76) Inventor: Horst Leitner, 330 Harold Dr., Laguna Beach, CA (US) 92651

( * ) Notice: Subject to any disclaimer, the term of this patent is extended or adjusted under 35 U.S.C. 154(b) by 461 days.

(21) Appl. No.: 10/961,835

(22) Filed: Oct. 8, 2004

(65) Prior Publication Data

US 2005/0151340 A1    Jul. 14, 2005

Related U.S. Application Data

(60) Provisional application No. 60/510,194, filed on Oct. 10, 2003, provisional application No. 60/525,074, filed on Nov. 25, 2003, provisional application No. 60/601,525, filed on Aug. 13, 2004.

(51) Int. Cl.
   *B60R 3/00*    (2006.01)
(52) U.S. Cl. ...................................... 280/166; 280/163
(58) Field of Classification Search ................ 280/166, 280/163, 169, 762, 763.1, 764.1, 765.1, 766.1
   See application file for complete search history.

(56) References Cited

U.S. PATENT DOCUMENTS

| | | | |
|---|---|---|---|
| 1,471,972 A | 10/1923 | Miller | |
| 2,122,040 A | 6/1938 | Machovec | |
| 2,436,961 A | 3/1948 | Gabriel | |
| 2,487,921 A | 11/1949 | Culver | |
| 2,492,068 A | 12/1949 | Schofield et al. | |
| 2,575,615 A | 11/1951 | Crump | |
| 2,764,422 A | 9/1956 | McDonald | |
| 2,925,876 A | 2/1960 | Wagner | |
| 3,039,562 A | 6/1962 | Wagner | |
| 3,095,216 A | 6/1963 | Browne et al. | |
| 3,172,499 A | 3/1965 | Stairs | |
| 3,494,634 A | 2/1970 | De Paula | |
| 3,528,574 A | 9/1970 | Denner et al. | |
| 3,572,754 A * | 3/1971 | Fowler | ..................... 280/166 |
| 3,762,742 A | 10/1973 | Bucklen | |
| 3,807,757 A | 4/1974 | Carpenter et al. | |

(Continued)

FOREIGN PATENT DOCUMENTS

CA    2082177    5/1994

(Continued)

OTHER PUBLICATIONS

USPTO Serial No. 10/996,125; Inventor Horst Leitner; Filing Date Nov. 23, 2004.

(Continued)

*Primary Examiner*—J. Allen Shriver
*Assistant Examiner*—Bridget Avery
(74) *Attorney, Agent, or Firm*—Knobbe Martens Olson & Bear LLP

(57) ABSTRACT

A retractable step assist for a vehicle comprises a step, an actuator, an optical fiber sensor, and a safety. The step is movable between a retracted position and a deployed position that is downward and outboard from the retracted position. The actuator is mechanically connected to the step to position the step. The optical fiber sensor has an output that varies when pressure is applied to the optical fiber sensor. The safety is triggered by this output from the optical fiber sensor. The safety is configured to terminate retraction of the step when the optical fiber sensor senses pressure from an object pinched by the step deck.

35 Claims, 22 Drawing Sheets

U.S. PATENT DOCUMENTS

| | | | |
|---|---|---|---|
| 3,833,240 A | 9/1974 | Weiler | |
| 3,865,399 A | 2/1975 | Way | |
| 3,887,217 A | 6/1975 | Thomas | |
| 3,889,997 A | 6/1975 | Schoneck | |
| 3,957,284 A | 5/1976 | Wright | |
| 3,961,809 A | 6/1976 | Clugston | |
| 3,981,515 A | 9/1976 | Rosborough | |
| 4,020,920 A | 5/1977 | Abbott | |
| 4,073,502 A | 2/1978 | Frank | |
| 4,106,790 A | 8/1978 | Weiler | |
| 4,110,673 A | 8/1978 | Nagy et al. | |
| 4,116,457 A | 9/1978 | Nerem | |
| 4,164,292 A | 8/1979 | Karkau | |
| 4,174,021 A | 11/1979 | Barlock | |
| 4,180,143 A | 12/1979 | Clugston | |
| 4,185,849 A | 1/1980 | Jaeger | |
| 4,188,889 A | 2/1980 | Favrel | |
| 4,231,583 A | 11/1980 | Learn | |
| 4,424,751 A | 1/1984 | Blochlinger | |
| 4,440,364 A | 4/1984 | Cone et al. | |
| 4,536,004 A | 8/1985 | Brynielsson et al. | |
| 4,542,805 A | 9/1985 | Hamlin et al. | |
| 4,570,962 A | 2/1986 | Chavira | |
| 4,623,160 A | 11/1986 | Trudell | |
| D287,001 S | 12/1986 | Jarvie et al. | |
| 4,679,810 A | 7/1987 | Kimball | |
| 4,720,116 A | 1/1988 | Williams et al. | |
| 4,733,752 A | 3/1988 | Sklar | |
| 4,909,700 A | 3/1990 | Fontecchio | |
| 4,982,974 A | 1/1991 | Guidry | |
| 5,005,667 A | 4/1991 | Anderson | |
| 5,005,850 A | 4/1991 | Baughman | |
| 5,039,119 A | 8/1991 | Baughman | |
| 5,085,450 A | 2/1992 | DeHart | |
| 5,154,125 A | 10/1992 | Renner et al. | |
| 5,195,609 A | 3/1993 | Ham et al. | |
| 5,199,731 A | 4/1993 | Martin | |
| 5,228,707 A | 7/1993 | Yoder | |
| 5,228,761 A | 7/1993 | Huebschen et al. | |
| 5,238,300 A | 8/1993 | Slivon et al. | |
| 5,257,847 A | 11/1993 | Yonehara | |
| 5,284,349 A | 2/1994 | Bruns et al. | |
| 5,286,049 A | 2/1994 | Khan | |
| 5,342,073 A | 8/1994 | Poole | |
| 5,375,864 A | 12/1994 | McDaniel | |
| 5,423,463 A | 6/1995 | Weeks | |
| 5,439,342 A | 8/1995 | Hall et al. | |
| 5,462,302 A | 10/1995 | Leitner | |
| 5,498,012 A | 3/1996 | McDaniel et al. | |
| 5,501,475 A | 3/1996 | Bundy | |
| 5,505,476 A | 4/1996 | Maccabee | |
| 5,513,866 A | 5/1996 | Sisson | |
| 5,538,100 A | 7/1996 | Hedley | |
| 5,538,265 A | 7/1996 | Chen et al. | |
| 5,538,269 A | 7/1996 | McDaniel | |
| 5,547,040 A | 8/1996 | Hanser et al. | |
| 5,584,493 A | 12/1996 | Demski et al. | |
| 5,601,300 A | 2/1997 | Fink et al. | |
| 5,727,840 A | 3/1998 | Ochiai et al. | |
| 5,779,208 A | 7/1998 | McGraw | |
| 5,842,709 A | 12/1998 | Maccabee | |
| 5,941,342 A | 8/1999 | Lee | |
| 5,957,237 A | 9/1999 | Tigner | |
| 6,042,052 A | 3/2000 | Smith | |
| 6,055,780 A | 5/2000 | Yamazaki | |
| 6,082,751 A | 7/2000 | Hanes et al. | |
| 6,149,172 A | 11/2000 | Pascoe | |
| 6,203,040 B1 | 3/2001 | Hutchins | |
| 6,213,486 B1 | 4/2001 | Kunz | |
| 6,270,099 B1 | 8/2001 | Farkash | |
| 6,325,397 B1 | 12/2001 | Pascoe | |
| 6,375,207 B1 | 4/2002 | Dean | |
| 6,412,799 B1 | 7/2002 | Schrempf | |
| 6,422,342 B1 | 7/2002 | Armstrong et al. | |
| 6,425,572 B1 | 7/2002 | Lehr | |
| 6,435,534 B1 | 8/2002 | Stone | |
| 6,439,342 B1 | 8/2002 | Boykin | |
| 6,460,915 B1 | 10/2002 | Bedi et al. | |
| 6,513,821 B1 | 2/2003 | Heil | |
| 6,533,303 B1 | 3/2003 | Watson | |
| 6,641,158 B2 | 11/2003 | Leitner | |
| 6,663,125 B1 | 12/2003 | Cheng | |
| 6,830,257 B2 | 12/2004 | Leitner | |
| 6,834,875 B2 | 12/2004 | Leitner | |
| 6,918,624 B2 | 7/2005 | Miller et al. | |
| 6,926,295 B2 | 8/2005 | Berkebile et al. | |
| 6,938,909 B2 | 9/2005 | Leitner | |
| 6,942,233 B2 | 9/2005 | Leitner et al. | |
| 6,942,272 B2 | 9/2005 | Livingston | |
| 6,948,903 B2 | 9/2005 | Ablabutyan et al. | |
| 6,955,370 B2 | 10/2005 | Fabiano et al. | |
| 6,959,937 B2 | 11/2005 | Schneider et al. | |
| 6,966,597 B2 | 11/2005 | Tegtmeier | |
| 6,971,652 B2 | 12/2005 | Bobbert et al. | |
| 6,997,469 B2 | 2/2006 | Lanoue et al. | |
| 7,000,932 B2 | 2/2006 | Heil et al. | |
| 7,007,961 B2 * | 3/2006 | Leitner et al. | 280/166 |
| 7,017,927 B2 | 3/2006 | Henderson et al. | |
| 7,055,839 B2 * | 6/2006 | Leitner | 280/166 |
| 7,070,194 B2 | 7/2006 | Garland et al. | |
| 7,090,276 B1 | 8/2006 | Bruford et al. | |
| 7,111,858 B2 | 9/2006 | Manser et al. | |
| 7,118,120 B2 | 10/2006 | Lee et al. | |
| 7,118,150 B2 | 10/2006 | Bruford et al. | |
| 2002/0109446 A1 | 8/2002 | Arnold | |
| 2002/0113400 A1 | 8/2002 | Leitner | |
| 2002/0153201 A1 | 10/2002 | Warford | |
| 2003/0090081 A1 | 5/2003 | Oakley | |
| 2003/0094781 A1 | 5/2003 | Jaramillo et al. | |
| 2003/0132595 A1 | 7/2003 | Fabiano | |
| 2003/0184040 A1 | 10/2003 | Leitner | |
| 2004/0084868 A1 | 5/2004 | Leitner | |
| 2004/0100063 A1 | 5/2004 | Henderson et al. | |
| 2004/0108678 A1 | 6/2004 | Berkebile et al. | |
| 2004/0124601 A1 | 7/2004 | Leitner | |
| 2004/0135339 A1 | 7/2004 | Kim | |
| 2004/0164580 A1 | 8/2004 | Armstrong et al. | |
| 2005/0006870 A1 | 1/2005 | Williams | |
| 2005/0035568 A1 | 2/2005 | Lee et al. | |
| 2005/0087951 A1 | 4/2005 | Leitner et al. | |
| 2005/0104318 A1 | 5/2005 | Lee et al. | |
| 2005/0151340 A1 | 7/2005 | Leitner | |
| 2005/0167941 A1 | 8/2005 | Garland et al. | |
| 2005/0173886 A1 | 8/2005 | Leitner | |
| 2005/0179227 A1 | 8/2005 | Leitner | |
| 2005/0258616 A1 | 11/2005 | Scheuring, III et al. | |
| 2005/0280242 A1 | 12/2005 | Fabiano et al. | |
| 2006/0082096 A1 | 4/2006 | Sukonthapanich et al. | |
| 2006/0091638 A1 | 5/2006 | Leitner et al. | |
| 2006/0208449 A1 | 9/2006 | Kuo et al. | |
| 2006/0214386 A1 | 9/2006 | Watson | |
| 2007/0012498 A1 | 1/2007 | Schulz | |

FOREIGN PATENT DOCUMENTS

| | | |
|---|---|---|
| CA | 2370618 | 11/2000 |
| CA | 2332193 | 9/2001 |
| DE | 31 51 621 A1 | 7/1983 |
| DE | G 89 19 833.3 | 10/1990 |
| DE | 89 10 933.3 | 11/1990 |
| GB | 934387 | 8/1963 |
| JP | 63255144 | 10/1988 |
| JP | 4339040 | 11/1992 |
| JP | 4339041 | 11/1992 |

| | | |
|---|---|---|
| JP | 04342629 A | 11/1992 |
| JP | 05310081 A | 11/1993 |
| SU | 403594 | 10/1974 |
| WO | WO 03/039910 A1 | 5/2003 |
| WO | WO 03/039920 A1 | 5/2003 |

OTHER PUBLICATIONS

USPTO Serial No. 10/993,047; Inventors Leitner et al.; Filing Date Nov. 19, 2004.

USPTO Serial No. 10/643,708; Inventors Leitner et al.; Filing Date Aug. 19, 2003.

USPTO Serial No. 10/641,358; Inventor Horst Leitner; Filing Date Aug. 14, 2003.

USPTO Serial No. 10/977,321; Inventor Horst Leitner; Filing Date Oct. 29, 2004.

* cited by examiner

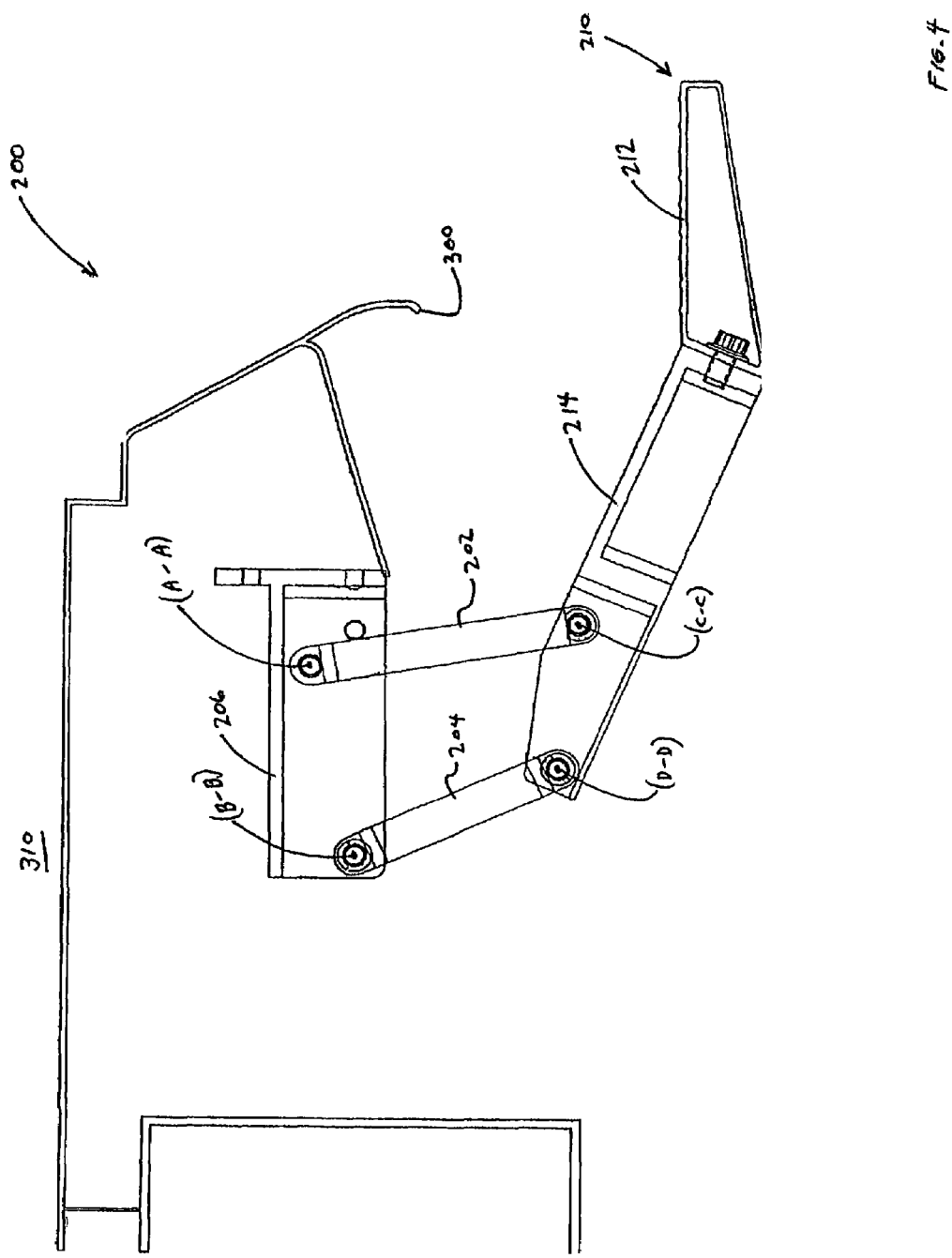

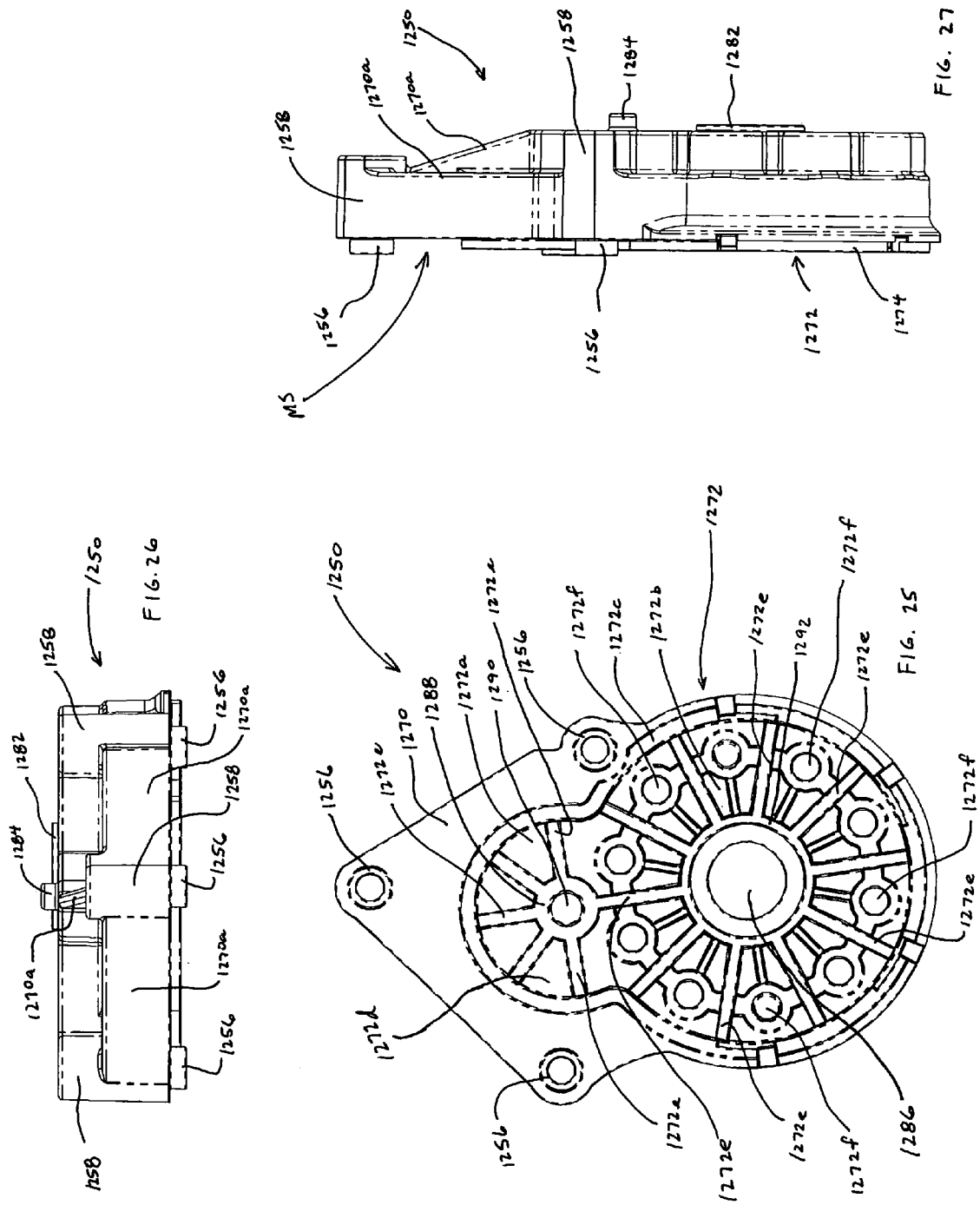

DRIVE SYSTEMS FOR RETRACTABLE VEHICLE STEP

RELATED APPLICATIONS

This application claims the benefit of U.S. Provisional Patent Application Ser. No. 60/510,194, filed Oct. 10, 2003, titled RETRACTABLE VEHICLE STEP WITH INLINE MOTOR; and of U.S. Provisional Patent Application Ser. No. 60/525,074, filed Nov. 25, 2003, titled RETRACTABLE VEHICLE STEP WITH INLINE MOTOR; and of U.S. Provisional Patent Application Ser. No. 60/601,525, filed Aug. 13, 2004, titled DRIVE SYSTEMS FOR RETRACTABLE VEHICLE STEP. The entire contents of each of the above-mentioned provisional patent applications are hereby incorporated by reference herein and made a part of this specification.

BACKGROUND OF THE INVENTION

1. Field of the Invention

This invention relates generally to drive systems usable with stepping assists for motor vehicles.

2. Description of the Related Art

It is commonly known to add a retractable running board or stepping assist to the side of a motor vehicle, especially to a vehicle with a relatively high ground clearance. A variety of drive systems have been developed for these retractable stepping assists, for moving a step member between retracted and deployed positions. However, the drive systems are often unreliable, inefficient, too heavy, and/or too bulky. Accordingly, a drive system which overcomes one or more of these problems is desired.

SUMMARY OF THE INVENTION

In accordance with one embodiment, there is provided a drive system for use with a retractable vehicle step having (i) a first arm with an upper portion rotatably mountable with respect to an underside of a vehicle so as to be rotatable about a first axis of rotation oriented generally parallel to the ground and (ii) a step member rotatably connected to the first arm so as to be movable generally along an inboard-outboard axis between a retracted position and an extended position. The drive system comprises an electric motor having an armature configured to rotate about an armature axis generally parallel to the first axis, and a pinion gear drivingly connected with respect to the motor. The pinion gear has a first outside diameter. The drive system further comprises an output gear in meshing engagement with the pinion gear. The output gear has a second outside diameter. The pinion gear and the output gear achieve a gear reduction of at least 3:1, and the larger of the first outside diameter and the second outside diameter is no more than 3.0 times the smaller of the first outside diameter and the second outside diameter.

In accordance with another embodiment, there is provided a drive system for use with a retractable vehicle step. The drive system comprises an electric motor having an armature configured to rotate about an armature axis, and a pinion gear drivingly connected with respect to the motor. The pinion gear has a first outside diameter. The drive system further comprises an output gear in meshing engagement with the pinion gear. The output gear has a second outside diameter. The drive system further comprises an output shaft having a drive end configured for driving engagement with the retractable vehicle step. The output gear is mounted on the output shaft and the output shaft is configured to rotate about an output shaft axis which is generally parallel to the armature axis. The pinion gear and the output gear achieve a gear reduction of at least 3:1, and the larger of the first outside diameter and the second outside diameter is no more than 3.0 times the smaller of the first outside diameter and the second outside diameter.

In accordance with another embodiment, there is provided a drive system for use with a retractable vehicle step having (i) a first arm with an upper portion rotatably mountable with respect to an underside of a vehicle so as to be rotatable about a first axis of rotation oriented generally parallel to the ground and (ii) a step member rotatably connected to the first arm so as to be movable generally along an inboard-outboard axis between a retracted position and an extended position. The drive system comprises an electric motor having an armature configured to rotate about an armature axis generally parallel to the first axis, a pinion gear drivingly connected with respect to the motor, an output gear in meshing engagement with the pinion gear, and an output shaft having a drive end configured for driving engagement with the retractable vehicle step. The output gear is mounted on the output shaft, and the output shaft is configured to rotate about an output shaft axis. The drive system further comprises a breakaway member connecting the output gear to the output shaft. The breakaway member prevents relative angular motion of the output gear and the output shaft, except in response to application of a breakaway torque to one of the output gear and the output shaft.

In accordance with another embodiment there is provided a drive system for use with a retractable vehicle step having (i) a first arm with an upper portion rotatably mountable with respect to an underside of a vehicle so as to be rotatable about a first axis of rotation oriented generally parallel to the ground and (ii) a step member rotatably connected to the first arm so as to be movable generally along an inboard-outboard axis between a retracted position and an extended position. The drive system comprises an electric motor having an armature configured to rotate about an armature axis generally parallel to the first axis. The electric motor comprises a standard automotive window-lift unit.

In accordance with another embodiment, there is provided a drive system for use with a retractable vehicle step. The drive system comprises an electric motor having an armature configured to rotate about an armature axis, and a pinion gear drivingly connected with respect to the motor. The pinion gear has a first outside diameter. The drive system further comprises an output gear in meshing engagement with the pinion gear. The output gear has a second outside diameter. The drive system further comprises an output shaft having a drive end configured for driving engagement with the retractable vehicle step. The output gear is mounted on the output shaft, and the output shaft is configured to rotate about an output shaft axis generally parallel to the armature axis. The pinion gear and the output gear comprise helical gears, and the larger of the first outside diameter and the second outside diameter is no more than 3.0 times the smaller of the first outside diameter and the second outside diameter.

In accordance with another embodiment, there is provided a drive system for use with a retractable vehicle step. The drive system comprises a motor assembly having a drive shaft extending therefrom, a pinion gear connected to the drive shaft and configured to rotate about a pinion axis, and a pinion housing at least partially surrounding the pinion gear. The pinion housing extends generally along the pinion axis. The drive system further comprises a pinion bearing rotatably connecting the pinion gear to the pinion housing. An inner portion of the pinion bearing is coupled to the pinion gear and an outer portion of the pinion bearing is coupled to the pinion housing. The pinion bearing is configured to bear radial loads transmitted through the pinion gear and oriented generally perpendicular to the pinion axis, and isolate the motor assembly from the radial loads. The drive system further comprises an output gear in meshing engagement with the pinion gear. The pinion gear and the output gear comprise crossed helical gears achieving a gear reduction of at least 3:1.

In accordance with another embodiment, there is provided a drive system for use with a retractable vehicle step having (i) a first arm with an upper portion rotatably mountable with respect to an underside of a vehicle so as to be rotatable about a first axis of rotation oriented generally parallel to the ground and (ii) a step member rotatably connected to the first arm so as to be movable generally along an inboard-outboard axis between a retracted position and an extended position. The drive system comprises a motor assembly comprising a motor and a drive shaft connected with respect to the motor. The motor assembly is configured to rotate the drive shaft at about 40-160 RPM when unloaded. The drive system further comprises a pinion gear drivingly connected with respect to the drive shaft. The pinion gear has a first outside diameter. The drive system further comprises an output gear in meshing engagement with the pinion gear. The output gear has a second outside diameter. The pinion gear and the output gear achieve a gear reduction, and the larger of the first outside diameter and the second outside diameter is no more than 3.0 times the smaller of the first outside diameter and the second outside diameter.

In accordance with another embodiment, there is provided a drive system for use with a retractable vehicle step having (i) a first arm with an upper portion rotatably mountable with respect to an underside of a vehicle so as to be rotatable about a first axis of rotation oriented generally parallel to the ground and (ii) a step member rotatably connected to the first arm so as to be movable generally along an inboard-outboard axis between a retracted position and an extended position. The drive system comprises a motor and a drive shaft connected with respect to the motor, and a pinion gear drivingly connected with respect to the drive shaft. The pinion gear has a first outside diameter. The drive system further comprises an output gear in meshing engagement with the pinion gear. The output gear has a second outside diameter. The output gear is drivingly connected with respect to the first arm. The pinion gear and the output gear achieve a gear reduction, and the larger of the first outside diameter and the second outside diameter is no more than 3.0 times the smaller of the first outside diameter and the second outside diameter. The motor is configured to rotate the first arm at about 7-22 RPM when the drive system is moving the step member toward the deployed position.

In accordance with another embodiment, there is provided a drive system for a retractable vehicle step which is configured for attachment to a vehicle. The drive system comprises a frame configured for attachment to the vehicle. The frame is further configured for rotatable connection of a first pivot arm to the frame so that the first pivot arm is rotatable about a first axis of rotation. The drive system further comprises a motor mount removably attached to the frame. The motor mount comprises a motor mounting surface located opposite the frame. The drive system further comprises a motor assembly removably connected to the motor mount at the motor mounting surface. The motor mount spaces the motor assembly from the frame to form a first lateral space between the motor assembly and the frame. The drive system further comprises an output gear located in the first lateral space, the output gear in driving engagement with the motor assembly, the output gear rotatable with respect to the frame about an output axis oriented generally parallel to the first axis of rotation.

In accordance with another embodiment, there is provided a retractable vehicle step for use with a vehicle. The retractable vehicle step comprises a first frame configured for attachment to the vehicle. The first frame is further configured for rotatable connection of a first pivot arm to the first frame so that the first pivot arm is rotatable about a first axis of rotation. The retractable step further comprises a second frame configured for attachment to the vehicle. The second frame is further configured for rotatable connection of a second pivot arm to the second frame so that the second pivot arm is rotatable about the first axis of rotation. The retractable step further comprises a motor mount removably attached to the first frame. The motor mount comprises a motor mounting surface located opposite the frame. The retractable step further comprises a motor assembly removably connected to the motor mount at the mounting surface. The motor mount spaces the motor assembly from the first frame to form a first lateral space between the motor assembly and the first frame. The retractable step further comprises an output gear located in the first lateral space. The output gear is in driving engagement with the motor assembly, and the output gear is rotatable with respect to the first frame about an output axis oriented generally parallel to the first axis of rotation. The retractable step further comprises a stepping deck moveably connected with respect to the first frame and the second frame. The stepping deck is moveable between a retracted position and a deployed position under power delivered by the motor assembly.

BRIEF DESCRIPTION OF THE DRAWINGS

FIG. 4 is a side view of one embodiment of one embodiment of a retractable vehicle step.

FIG. 25 is a side elevation view of the motor mount of FIG. 23.

FIG. 26 is an end view of the motor mount of FIG. 23.

FIG. 27 is a top view of the motor mount of FIG. 23.

DETAILED DESCRIPTION OF THE PREFERRED EMBODIMENT

Figure 1:
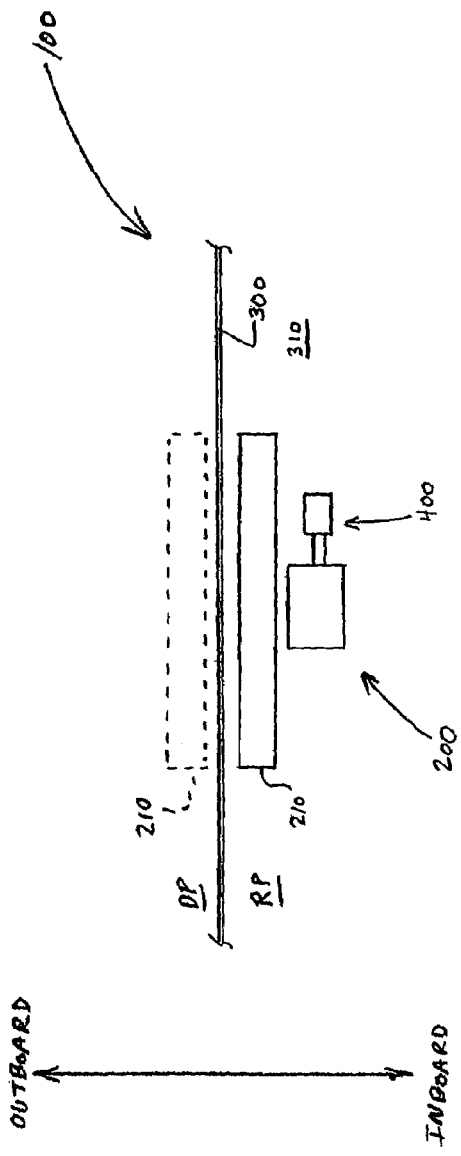
FIG. 1 is a schematic plan view of a retractable vehicle step system.
Figure 3:
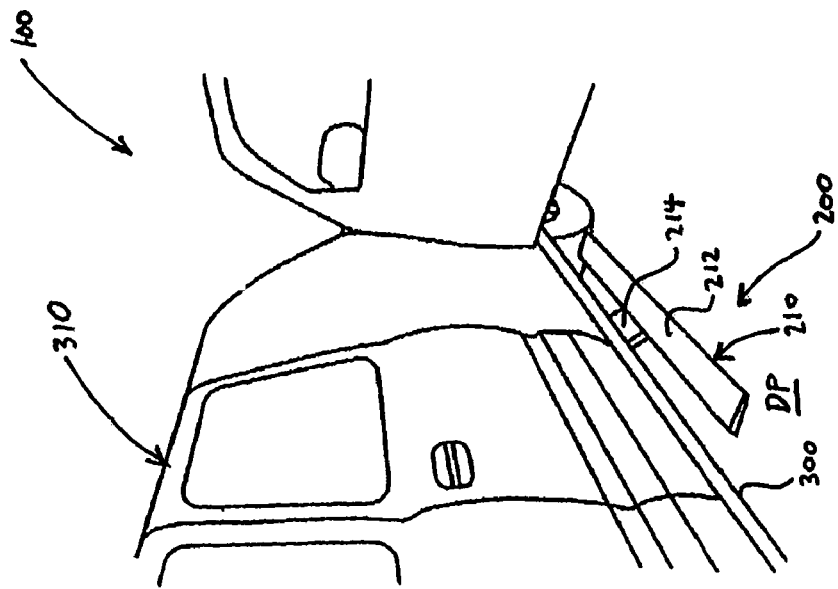
FIG. 3 is a perspective view of the retractable vehicle step system of FIG. 1, with the step member in the deployed position.
Figure 2:
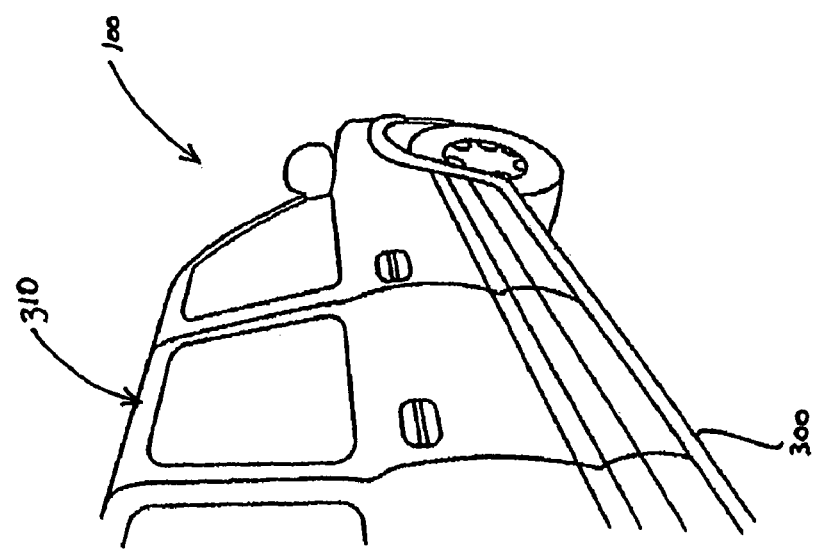
FIG. 2 is a perspective view of the retractable vehicle step system of FIG. 1, with the step member in the retracted position.

FIGS. 1-3 depict one embodiment of a retractable vehicle step system 100, which may generally comprise a retractable vehicle step 200 mounted adjacent an outboard edge 300 of a vehicle 310. A drive system 400 may be connected to the vehicle step 200 to provide powered movement of a step member 210 of the vehicle step 200 between a retracted position RP and a deployed position DP. In the depicted embodiment, the step member 210 is movable, under power delivered by the drive system 400, generally along an inboard-outboard direction between the retracted position RP, in which the step member 210 is partially or completely inboard of the outboard edge, and the deployed position DP, in which the step member 210 is partially or completely outboard of the edge 300. Accordingly, the step member 210 may serve as a step assist for entering the vehicle when in the deployed position DP.

The outboard edge 300 may comprise, for example, a lower outboard edge of the vehicle 310, such as a lower side edge, lower rear edge, or lower forward edge, depending on the mounting location of the retractable vehicle step 200. Where the edge 300 comprises a lower side edge, the edge 300 is oriented generally parallel to a direction of travel of the vehicle 310, and the inboard-outboard direction depicted in FIG. 1 is oriented generally perpendicular to the direction of travel. The direction of travel is typically parallel to the longitudinal axis of the vehicle 310. Where the edge 300 comprises a lower rear edge or lower forward edge of the vehicle 310, the edge 300 is oriented generally perpendicular to the direction of travel of the vehicle, and the inboard-outboard direction depicted in FIG. 1 is oriented generally parallel to the direction of travel.

The retractable vehicle step 200 may comprise any suitable retractable vehicle step mechanism, of which there are many presently known in the relevant arts. Of course, any suitable later-developed mechanism may also be employed as the retractable vehicle step 200. In some embodiments, the retractable vehicle step 200 may comprise any of the retractable-step mechanisms disclosed in U.S. Pat. No. 6,641,158, issued Nov. 4, 2003, titled RETRACTABLE VEHICLE STEP; or U.S. Patent Application Publication No. US 2003/0184040 A1 (application Ser. No. 10/274,418), published Oct. 2, 2003, titled RETRACTABLE VEHICLE STEP. The entire contents of each of the above-mentioned patent applications and publications are hereby incorporated by reference herein and made a part of this specification.

FIG. 4 depicts one mechanism that may be employed as the retractable vehicle step 200. This embodiment of the retractable vehicle step 200 includes a first arm 202 and a second arm 204, each of which is pivotably connectable via, e.g., a frame 206, with respect to the underside of the vehicle 310. (Alternatively, the first and second arms 202, 204 may be directly coupled to the underside of the vehicle 310.) The first and second arms 202, 204 are therefore pivotable with respect to the underside of the vehicle about generally parallel first and second axes A-A, B-B, respectively. Each of the first and second axes A-A, B-B is oriented generally parallel to the ground. The step member 210, which may comprise a stepping deck 212 rigidly connected to a support bracket 214, is connected to the first and second arms 202, 204 so as to be rotatable about third and fourth axes C-C, D-D, respectively. Thus, upon rotation of the first and second arms 202, 204 about the first and second axes A-A, B-B, the step member 210 moves between the retracted position RP and the deployed position DP.

It should be noted that the designation of the outboard arm as the "first arm" and the inboard arm as the "second arm," and the designation of the various axes as the first through fourth axes is for convenience only, and any of the arms or axes may be considered a first arm, second arm, first axis, second axis, etc. where these terms are used in the appended claims.

FIGS. 5-10 depict one embodiment of a drive system 400. The depicted drive system generally comprises a motor assembly 402 which drives a pinion gear 404, which in turn meshes with an output gear 406. The output gear 406 is mounted on and turns an output shaft 408, which forms a drive end 410 for connecting the drive system 400 to the retractable vehicle step 200. The pinion gear 404 rotates about a pinion axis F-F and the output gear 406 and output shaft 408 rotate about an output axis G-G.

In some embodiments, the motor assembly 402 comprises an electric motor 412 which in turn comprises an armature (see FIG. 12) which, when energized, rotates about an armature axis E-E. In certain such embodiments, the internal gearing of the motor assembly 402 is configured to orient a drive shaft 414 (as well as the pinion axis F-F, about which the drive shaft 414 rotates as well) of the motor assembly 402 generally perpendicular to the armature axis E-E. One suitable type of electric motor assembly 402 is a standard automotive window-lift motor, such as those available from Siemens AG of Munich, Germany. Such motors are particularly useful because of their ready availability, low cost, low weight and high reliability. Alternatively, any other suitable type of electric motor may be employed, or a pneumatic or hydraulic motor, or a hand crank may be employed to provide power for the drive system 400.

Figure 11:
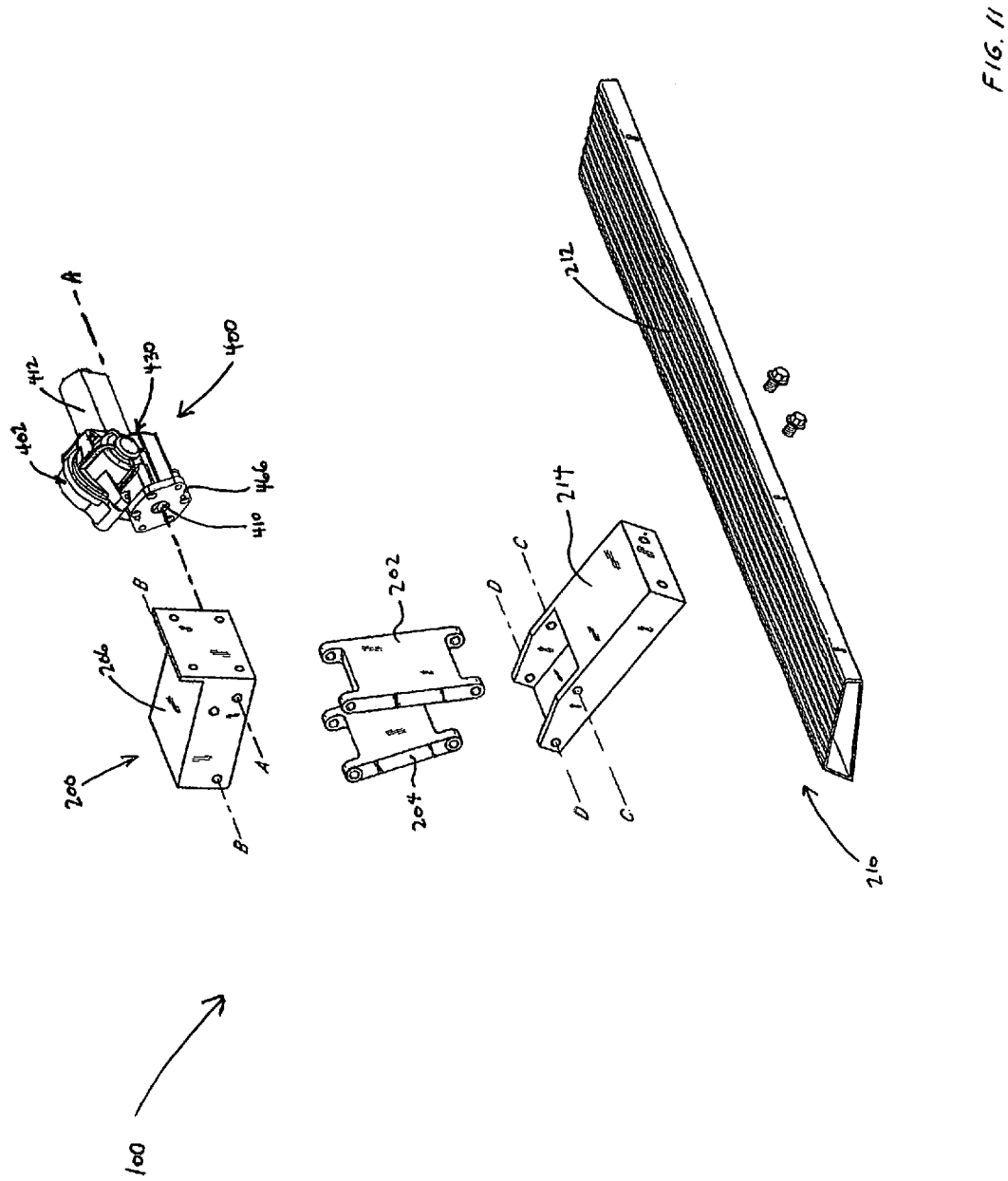
FIG. 11 is an exploded view of the retractable vehicle step of FIG. 4, connected to the drive system of FIG. 5.

Whether the motor assembly 402 comprises a window-lift motor as discussed above, or some other type of electric or non-electric motor, the speed of the motor 412 itself (e.g. the armature speed where an electric motor is employed) may, in various embodiments, be (i) about 4,500-6,000 RPM, or about 5,000-5,500 RPM, or about 5,300 RPM when unloaded (e.g., with no drive load coupled to the drive shaft 414); (ii) about 3,500-5,500 RPM, or 4,000-5,000 RPM, or about 4,500 RPM when deploying a retractable vehicle step (e.g. the step 200 depicted herein) connected with respect to the output gear 406 or output shaft 408; and/or (iii) about 2,500-4,500 RPM, or about 3,000-4,000 RPM, or about 3,500 RPM when retracting such a retractable vehicle step connected with respect to the output gear 406 or output shaft 408. Similarly, the speed of the drive shaft 414 may, in various embodiments, be (i) about 40-160 RPM, or about 75-125 RPM, or about 90 RPM when unloaded (e.g., with no drive load coupled to the drive shaft 414); (ii) about 30-150 RPM, or about 60-120 RPM, or about 75 RPM when deploying a retractable vehicle step (e.g. the step 200 depicted herein) connected with respect to the output gear 406 or output shaft 408; and/or (iii) about 15-140 RPM, or about 40-120 RPM, or about 60 RPM when retracting such a retractable vehicle step connected with respect to the output gear 406 or output shaft 408.

Where the drive system 400 is employed with a retractable vehicle step similar to that shown in FIG. 4, the output shaft 408 may be connected to the upper end of the first arm 202 (see FIG. 11) or the second arm 204, to drive the arm under power delivered by the motor assembly 402, and cause it to rotate about the first axis A-A or second axis B-B, thereby moving the step member 210 between the retracted and deployed positions. With the drive system 400 so connected to the retractable vehicle step 200, the output axis G-G will be substantially coincident with the first axis A-A or the second axis B-B, depending on whether the first arm 202 or the second arm 204 is driven by the drive system.

Figure 5:
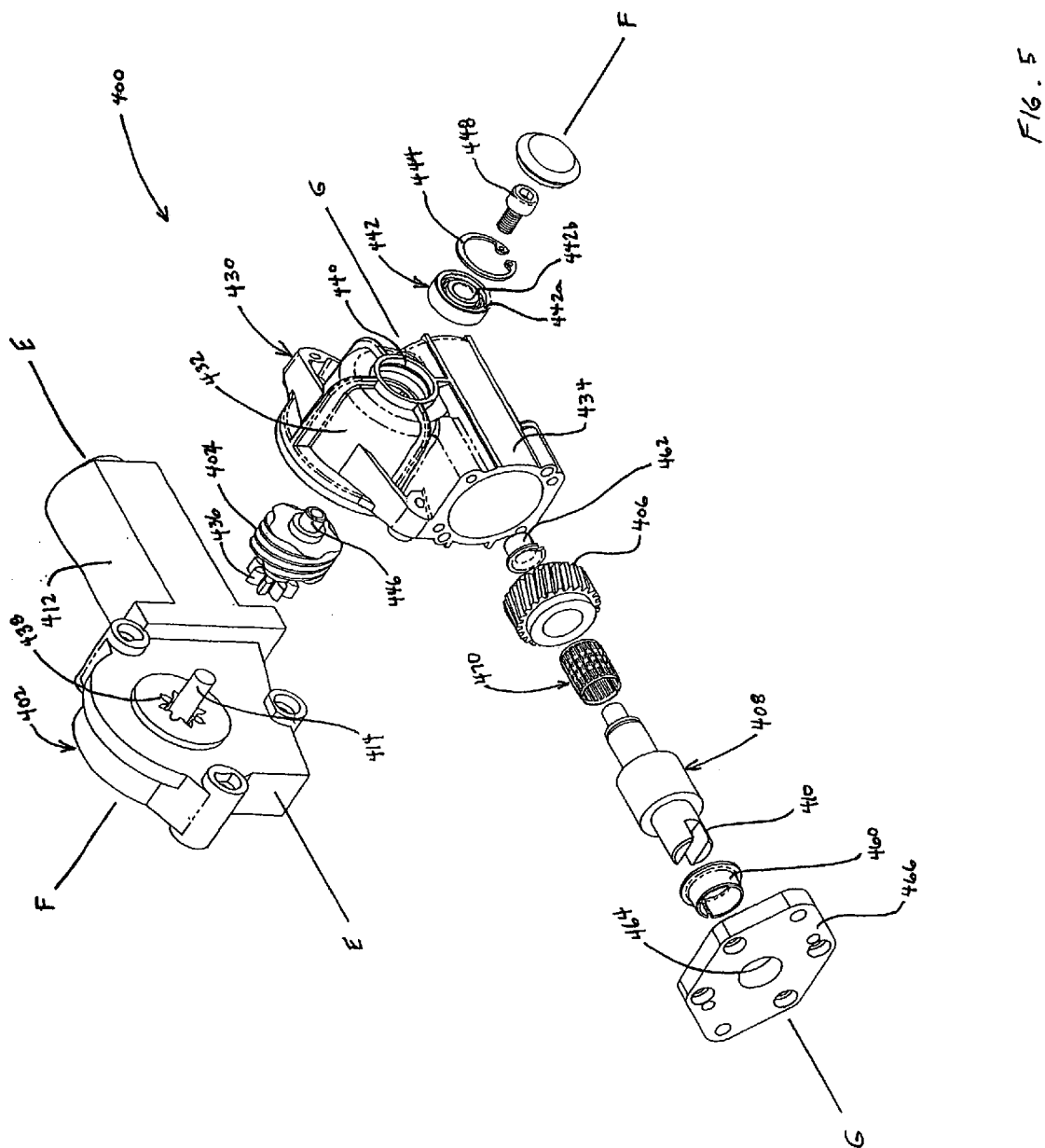
FIG. 5 is an exploded perspective view of one embodiment of a drive system for use with the step system of FIGS. 1-3 and/or the retractable vehicle step of FIG. 4.
Figure 6:
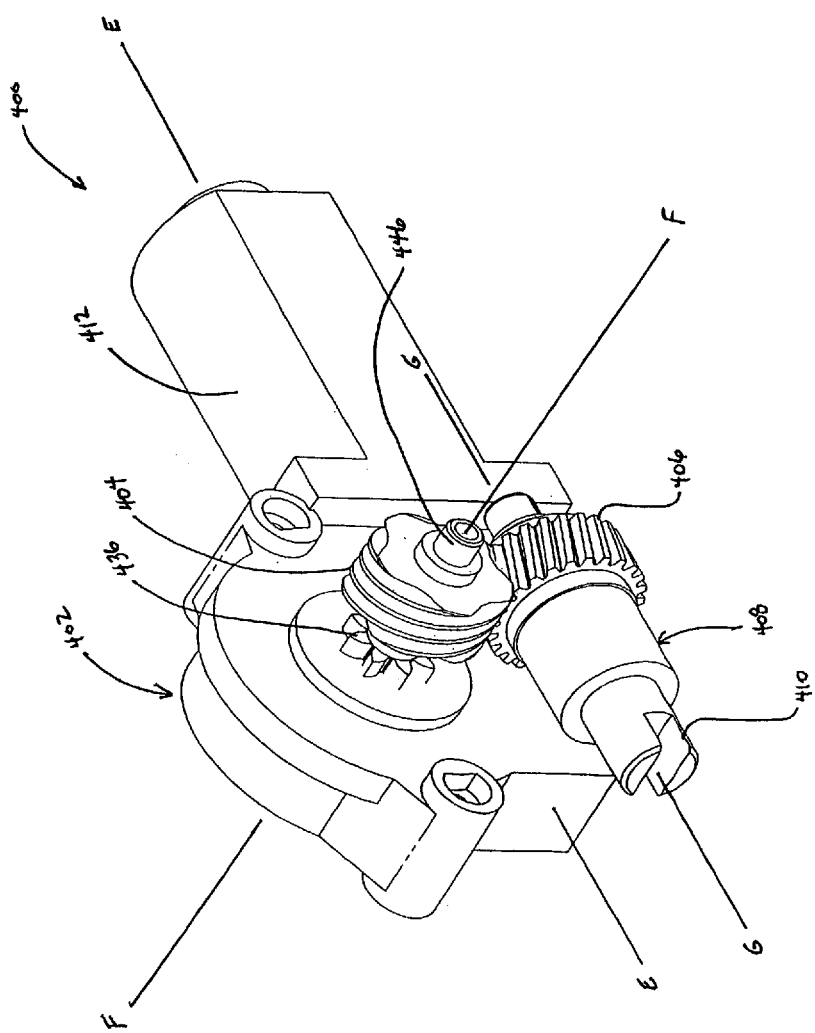
FIG. 6 is a second perspective view of the drive system of FIG. 5, with the gearbox thereof removed for clarity.
Figure 7:
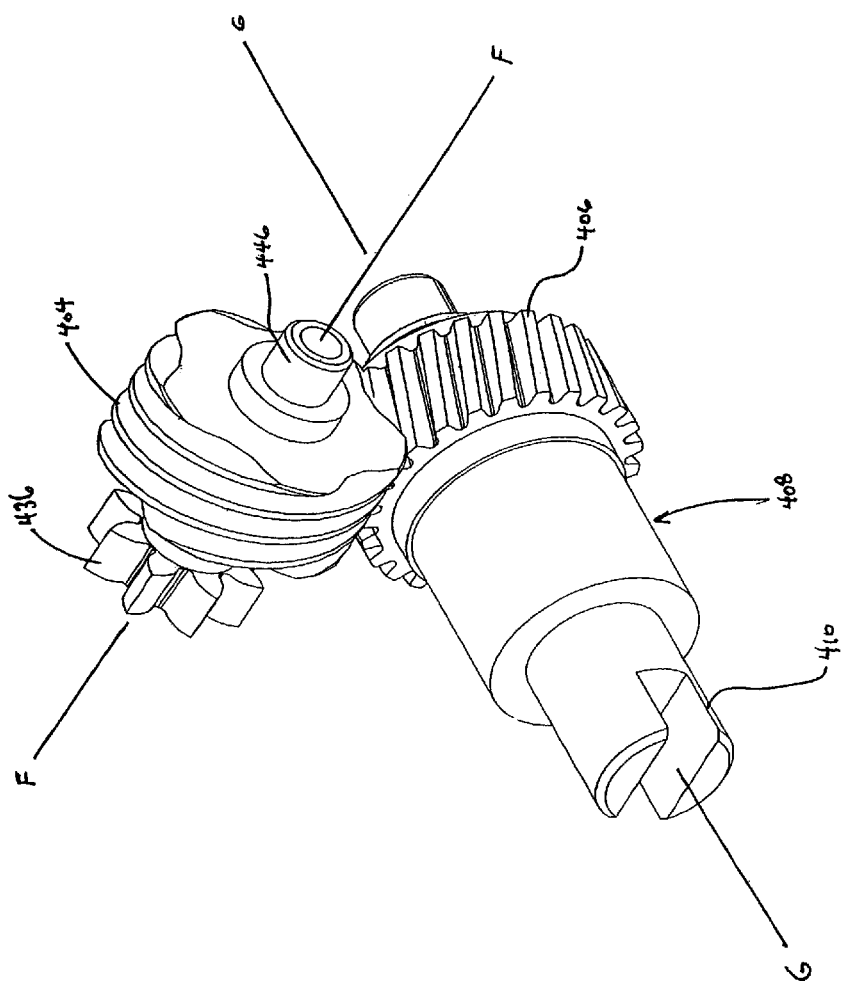
FIG. 7 is a detail view of the drive system of FIG. 5.

Moreover, where the drive system 400 is so connected to a retractable vehicle step 200 of the type shown in FIG. 4, and a motor assembly 402 of the type shown in FIG. 5 is employed, the armature axis E-E will extend generally parallel to the outboard edge 300 of the vehicle. This arrangement is advantageous because in some vehicles more room is available for mounting the retractable vehicle step in the lateral (i.e. generally parallel to the outboard edge 300) direction than in the inboard-outboard direction, or in the vertical direction. Accordingly, packaging is improved by mounting the motor assembly 402 such that its armature axis E-E (or, more generally, the long/largest dimension of the motor assembly 402) extends laterally (rather than inboard) from the retractable vehicle step 200.

In some embodiments, the pinion gear 404 and output gear 406 each comprise helical gears and form a right-angle helical drive. In certain such embodiments, the pinion gear 404 may comprise a 5-tooth helical gear with teeth arranged at a 75-degree helix angle, and/or the output gear 406 may comprise 25-tooth helical gear with a helix angle of 15 degrees. This arrangement facilitates a relatively high gear reduction (5:1) while permitting the gears 404, 406 to be of comparable outside diameter (the larger of the two preferably having an outside diameter no more than about 3.0, 2.0, 1.5, 1.2 or 1.1 times that of the smaller). In turn, the output gear 406 may be reduced in size, while preserving a relatively high gear reduction, without requiring an overly small (and weak) pinion gear 404. Accordingly, in various embodiments, the output gear has outside diameters of less than about 50 mm, less than about 40 mm, or less than about 35 mm. In still another embodiment, the output gear has an outside diameter of about 35 mm.

Use of a relatively small output gear 406 is beneficial in terms of packaging of the drive system 400, particularly where the system 400 is connected to a retractable vehicle step 200 of the type depicted in FIG. 4, such that the output axis G-G is substantially coincident with the second axis B-B. In such an installation of the system 400, minimizing the outside diameter of the output gear 406 can minimize the overall inboard protrusion of the retractable step 200-drive system 400 assembly, or at the very least minimize the inboard protrusion of the upper portions of the step-drive system assembly, nearest the underside of the vehicle 310, where the available space for installation of these components tends to be most restricted. Moreover, whether the drive system 400 is connected such that the output axis G-G is substantially coincident with the second axis B-B or the first axis A-A, a relatively small output gear 406 improves packaging because of the general scarcity of space in the inboard-outboard and vertical directions.

Accordingly, in one embodiment the entire drive system 400 fits within a three-dimensional box-shaped space or "package" (with sides oriented at right angles to each other) of about 7.5 inches, or about 7-9 inches (measured along the axis E-E) by about 3 inches, or about 3-4 inches (along the axis F-F) by about 4 inches, or about 4-5.5 inches (along an axis orthogonal to both axes E-E, F-F). In another embodiment, the entire drive system 400 fits within a two-dimensional rectangular "profile" of about 3 inches, or about 3-4 inches (measured along the axis F-F) by about 4 inches, or about 4-5.5 inches (measured perpendicular to the axis F-F). In still another embodiment, the drive system 400 less the motor assembly 402 (in other words, the gearbox 430 with all components connected thereto or installed therein) fits within such a three-dimensional box-shaped space or "package" of about 4 inches, or about 4-5.5 inches (measured along the axis E-E) by about 2 inches, or about 2-3 inches (along the axis F-F) by about 3.5 inches, or about 3.5-5 inches (along an axis orthogonal to both axes E-E, F-F). In yet another embodiment, the drive system 400 less the motor assembly 402 fits within a two-dimensional rectangular "profile" of about 2 inches, or about 2-3 inches (measured along the axis F-F) by about 3.5 inches, or about 3.5-5 inches (measured perpendicular to the axis F-F).

The gear parameters specified above may be varied in other embodiments. For example, the pinion gear 404 may alternatively have 1, 2, 3, 4, 6, 7, 8 or more teeth, and the number of teeth on the output gear correspondingly varied to achieve the desired gear reduction, which may be 2:1, 3:1, 4:1, 6:1, 7:1 or more. The helix angle of the pinion gear 404 may be varied from the 75-degree angle specified above (as one example, any suitable angle from 45-85 degrees may be employed; other suitable ranges include 60-85 degrees or 70-80 degrees), and the helix angle of the output gear 406 may be selected to complement that of the pinion gear 404. In still other embodiments, the pinion gear 404 and output gear 406 may comprise bevel gears, standard (non-helical) spur gears, a worm-and-worm-gear arrangement, etc., rather than the right-angle helical drive discussed above.

In some embodiments, the drive system 400 is configured to have an output speed (the speed of the output gear 406/output shaft 408) of about 10-25 RPM, or about 15-22 RPM, or about 17.8 RPM when unloaded (e.g., without a retractable vehicle step connected with respect to the output gear 406 or output shaft 408). In other embodiments, the drive system 400 is configured to have an output speed of about 7-22 RPM, about 12-19 RPM or about 15 RPM when deploying a retractable vehicle step (e.g. the step 200 depicted herein) connected with respect to the output gear 406 or output shaft 408. In still other embodiments, the drive system 400 is configured to have an output speed of about 4-19 RPM, about 9-16 RPM or about 11.7 RPM when retracting a retractable vehicle step (e.g. the step 200 depicted herein) connected with respect to the output gear 406 or output shaft 408. Note that when retracting or deploying a retractable vehicle step similar to the step 200 depicted herein, the output speed of the drive system 400 will be equivalent to the angular speed of the first arm 202 and/or second arm 204 as the step 200 deploys or retracts.

In some embodiments, the drive system 400 is configured to move a retractable vehicle step (such as, without limitation, retractable step similar to the step 200 disclosed herein) from the retracted position RP to the deployed position DP in about 0.3-2.0 seconds, or about 0.5-1.0 seconds. In still other embodiments, the drive system 400 is configured to move a retractable vehicle step (such as, without limitation, retractable step similar to the step 200 disclosed herein) from the deployed position DP to the retracted position RP in about 0.6-1.8 seconds, or about 0.8-1.5 seconds, instead of or in addition to the deployment-time capabilities mentioned above.

With further reference to FIGS. 5-10, the drive system 400 may further comprise a rigid gearbox 430, which in turn may further comprise a pinion housing 432 connected to (or integrally formed with) an output housing 434. The pinion housing 432 has a generally cylindrical interior that is substantially centered on and extends along the pinion axis F-F, and the output housing 434 has a generally cylindrical interior that is substantially centered on and extends along the output axis G-G. The pinion and output housings 432, 434 intersect in a manner that permits meshing engagement of the pinion and output gears 404, 406, contained therein, respectively.

The pinion gear 404 is mounted on the drive shaft 414 of the motor assembly and, in the depicted embodiment, forms a number of locking teeth 436 which are received in matching pockets 438 which rotate in concert with the drive shaft 414 under the power of the motor 412. The teeth 436 and pockets 438 coact to substantially prevent relative rotation of the drive shaft 414 and pinion gear 404 when the drive system 400 is in operation. Alternatively, any suitable structure, such as a spline, keyway, etc. may be employed instead of the teeth 436 and pockets 438 to prevent such relative rotation.

Figure 13:
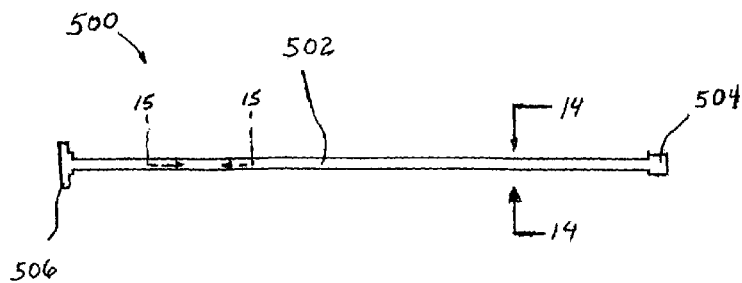
FIG. 13 is a sectional view of the drive system of FIG. 5, taken along the line 13-13 shown in FIG. 9.
Figure 14:
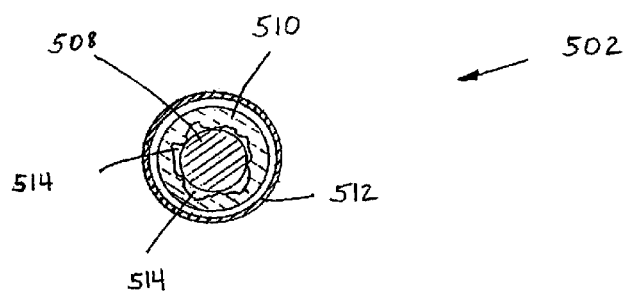
FIG. 14 is a detail view of the sectional view of FIG. 13.
Figure 15:
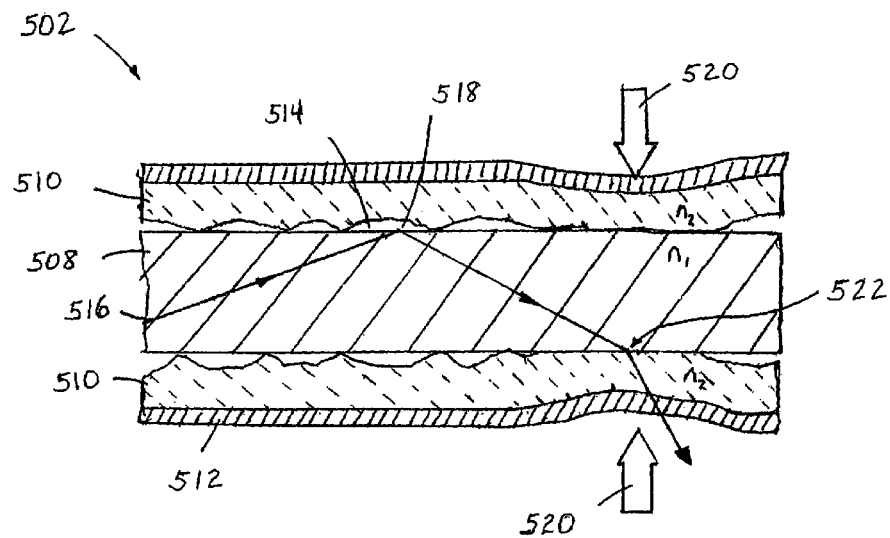
FIG. 15 is a perspective view of a retractable vehicle step system.

At its end opposite the motor assembly 402, the pinion housing 432 forms a bearing pocket 440 (see FIG. 5; in addition, FIGS. 13-14 will facilitate quicker understanding of this structure) which receives an outer race 442a of a pinion bearing 442, while a snap ring 444 retains the bearing 442 in the pocket 440. An inner race 442b of the pinion bearing 442 fits over an axle stub 446 formed on the pinion gear 404, and is secured thereto with a bearing screw 448. A dust cap 450 may be employed to prevent debris from entering the pinion housing 432. In one embodiment, the pinion bearing 442 comprises a radial bearing.

Accordingly, the pinion bearing 442 journals the pinion gear 404 with respect to the pinion housing 432, and coacts with the bearing pocket 440, snap ring 444 and screw 448 to bear any radial (or thrust) loads transmitted through the pinion gear 404 perpendicular to (or along) the pinion axis F-F. The pinion bearing 442, etc. therefore substantially isolate the motor assembly 402 from such radial or thrust loads and reduce the potential for damaging the motor assembly thereby.

In one embodiment, the pinion bearing 442 is configured to bear thrust loads acting in either direction generally along the pinion axis F-F (i.e. towards or away from the motor assembly 402). Such a bearing eliminates a possible need for a second bearing, located at an opposite end of the pinion housing 432, to journal the pinion gear 404 with respect to the housing 432. This in turn eliminates alignment and tolerance issues that can arise with the use of multiple bearings and cause premature wear of one or both bearings.

The output shaft 408 is journalled to the output housing 434 via first and second output bushings 460, 462, with the first output bushing 460 received in an output opening 464 formed in an end plate 466 connected to the end of the output housing 434. The second output bushing 462 may be received in a similar opening (not shown) at an opposite end of the output housing 434.

In one embodiment, a breakaway member 470 is employed to connect the output gear 406 to the output shaft 408. In the depicted embodiment, the breakaway member 470 comprises a tolerance ring. The breakaway member 470 is disposed between the outside diameter of the output shaft 408 and the inside diameter of the output gear 406, and prevents relative angular motion of the output gear 406 and the output shaft 408, except in response to the application of a breakaway torque to the output gear or the output shaft. Such a breakaway torque may be applied when an obstruction blocks movement of the retractable step 200 while the motor assembly 402 is energized and turning, or when an external force is applied to the retractable vehicle step 200 to urge it toward the retracted or deployed position while the motor assembly 402 is stationary.

Figure 8:
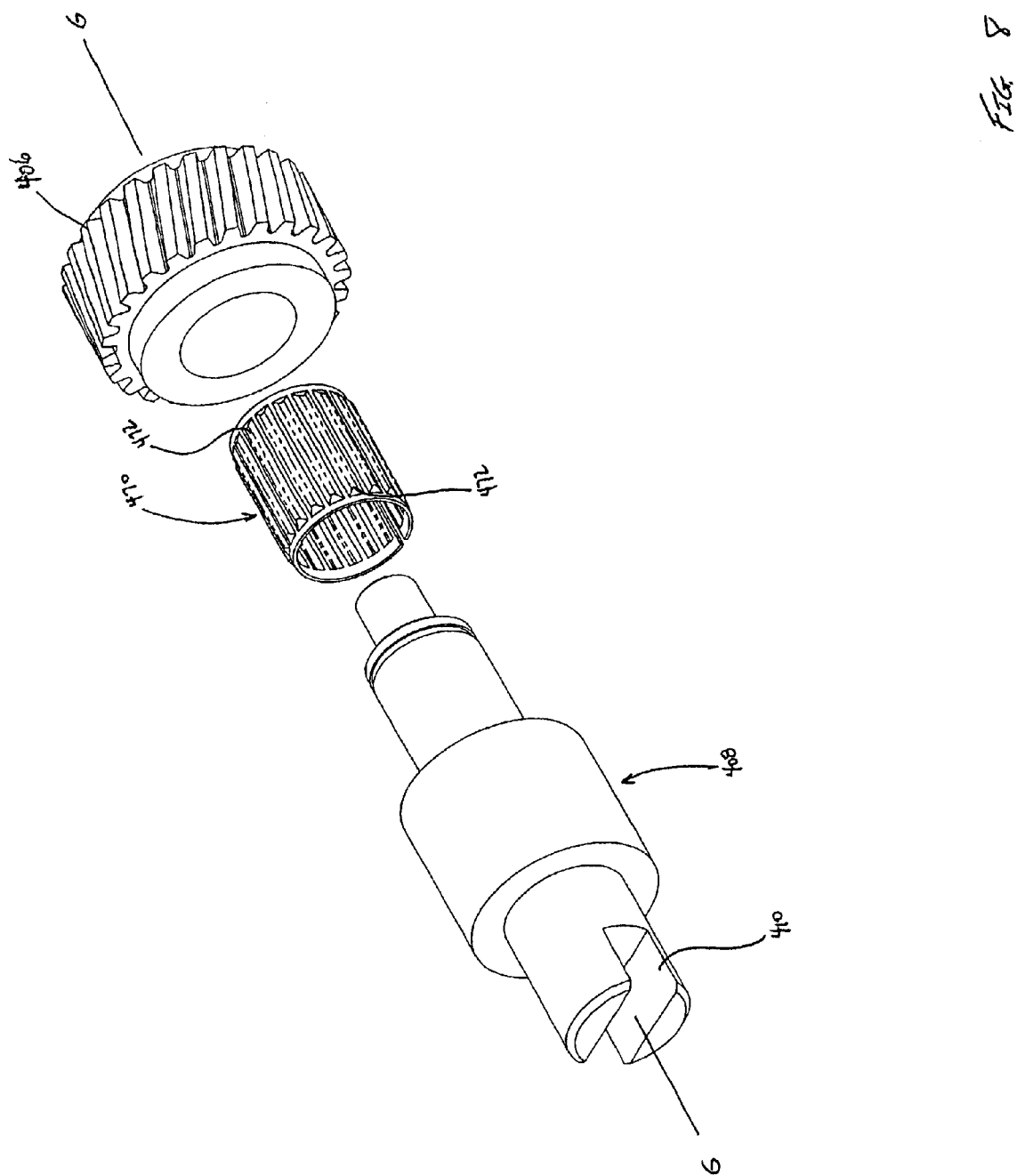
FIG. 8 is a second detail view of the drive system of FIG. 5.
Figure 9:
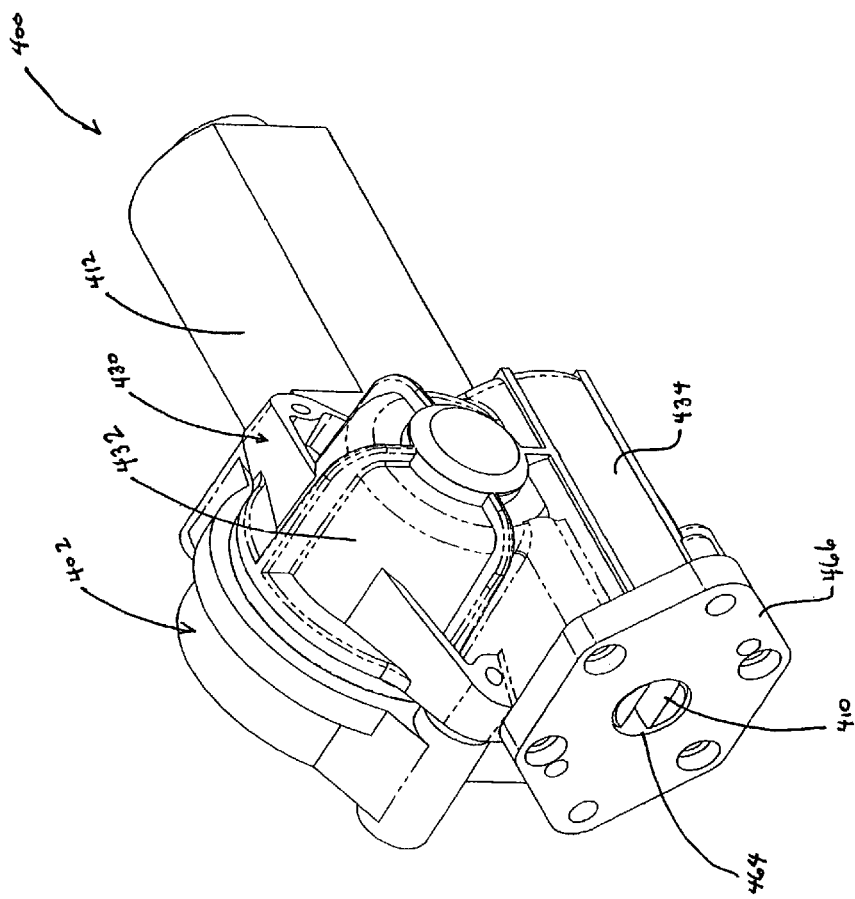
FIG. 9 is a third perspective view of the drive system of FIG. 5.
Figure 10:
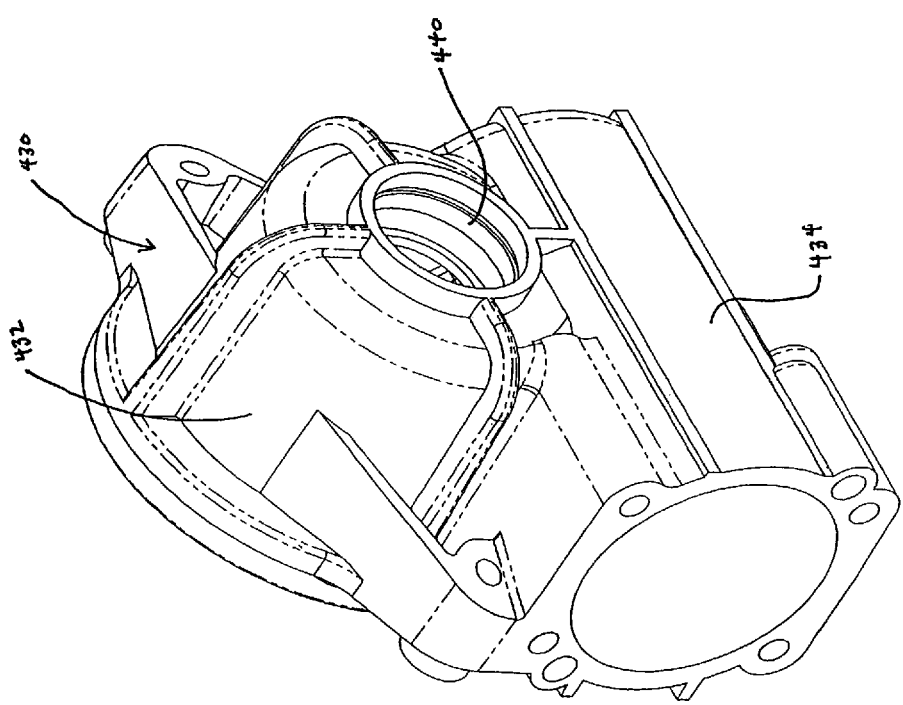
FIG. 10 is a detail view of the gearbox of the drive system of FIG. 5.

FIG. 8 depicts one embodiment of the breakaway member 470 in greater detail. The depicted breakaway member 470 comprises a generally cylindrical spring member which forms a number of longitudinally-extending ridges 472 on its surface. Preferably, the ridges are oriented such that their peaks contact the inside diameter of the output gear 406; more generally, the peaks may be oriented such that they contact whichever of the output gear and output shaft is constructed of a softer material. The inherent resilience of the ridges 472 allows the breakaway member 470 to act as a friction coupling between the output gear 406 and the output shaft 408. Preferably, the breakaway member 470 allows relative rotation of the output gear 406 and the output shaft 408 upon application of a breakaway torque of about 40 foot-pounds to the output gear or the output shaft. One preferred product for use as the breakaway member 470 is a tolerance ring model no. BN, available from USA Tolerance Rings of West Trenton, N.J.

Figure 12:
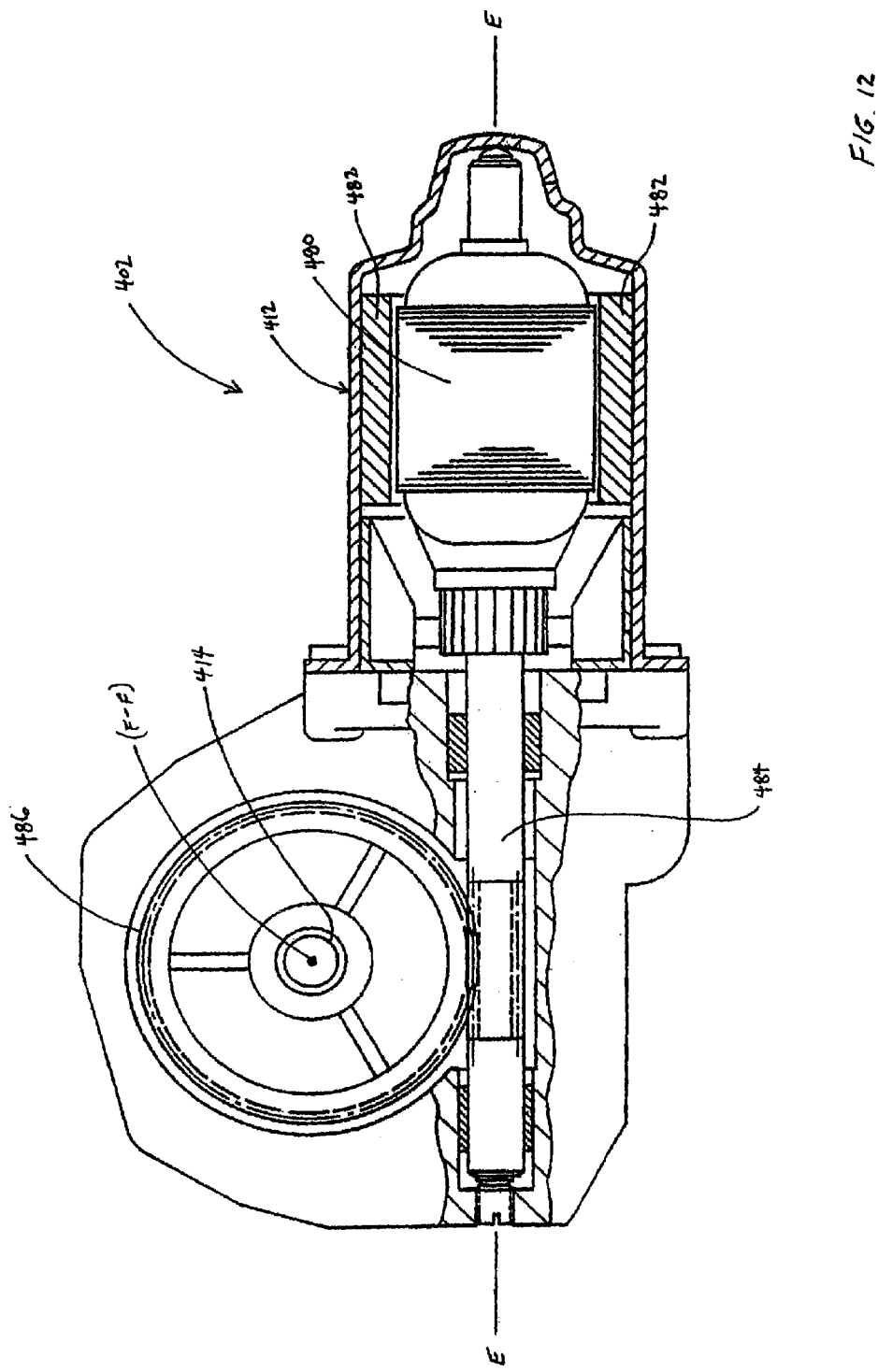
FIG. 12 is a partial sectional view of a motor assembly for use with the drive system of FIG. 5.

FIG. 12 depicts one embodiment of the motor assembly 402 in greater detail. The motor 412 comprises an armature 480 rotatably disposed in a space between magnets 482. A worm 484 extends from one end of the armature 480, and when energized the armature 480 rotates the worm 484 about the armature axis E-E at the same angular speed as the armature 480 itself. The worm 484 meshes with a worm gear 486, which rotates about the pinion axis F-F in concert with the drive shaft 414, which is coupled to the worm gear 486. The drive shaft 414 delivers power to the downstream portions of the drive system 400, as described above. Various embodiments of the motor assembly 402 (including without limitation the embodiment depicted in FIG. 12) may employ a gear reduction of about 20:1-180:1, or about 40:1-80:1, or about 80:1, or about 60:1 between the motor 412 itself (e.g., the armature where the motor 412 comprises an electric motor) and the drive shaft 414 of the motor assembly 402. Accordingly, in the embodiment depicted in FIG. 12 the worm 484 and worm gear 486 achieve a gear reduction as specified above.

FIGS. 15-18 depict a retractable vehicle step system 500 which is prior art to the system shown in FIGS. 19-27. The retractable vehicle step system 500 generally comprises a powered step mechanism 600 and an idler step mechanism 700, both of which are connected to a stepping deck 612. Under power delivered by a drive system 800 drivingly connected to the powered step mechanism 600, the powered and idler mechanisms 600, 700 move the stepping deck 612 between a retracted position (e.g., the retracted position RP shown in FIG. 1) and the deployed position depicted in FIG. 15. The deployed position is located downward and outboard of the retracted position.

Each of the powered step mechanism 600 and idler step mechanism 700 comprises a four-bar linkage which functions in a manner generally similar to the mechanism 200 depicted in FIG. 4. Thus, the powered step mechanism 600 includes a first arm 602 and a second arm 604, each of which is pivotably connected to a generally rigid frame 606. The frame 606 is configured to be secured to a vehicle (not shown), particularly the underside thereof, via a mounting flange 608. The first and second arms 602, 604 are therefore pivotable with respect to frame 606 about generally parallel first and second axes A-A, B-B, respectively. When the retractable vehicle step system 500 is mounted on a vehicle, each of the first and second axes A-A, B-B is oriented generally parallel to the ground. A support bracket 614 is rigidly connected to the stepping deck 612, and is connected to the first and second arms 602, 604 so as to be rotatable about third and fourth axes C-C, D-D, respectively. Thus, upon rotation of the first and second arms 602, 604 about the first and second axes A-A, B-B, the stepping deck 612 moves between the retracted position and the deployed position.

Similarly, the idler step mechanism 700 includes a first arm 702 and a second arm 704, each of which is pivotably connected to a generally rigid frame 706. The frame 706 is configured to be secured to the vehicle alongside the powered frame 606 via a mounting flange 708. The first and second arms 702, 704 are therefore pivotable with respect to frame 706 about the first and second axes A-A, B-B, respectively. A support bracket 714 is rigidly connected to the stepping deck 612, and is connected to the first and second arms 702, 704 so as to be rotatable about the third and fourth axes C-C, D-D, respectively. Thus, upon rotation of the first and second arms 602, 604, 702, 704 about the first and second axes A-A, B-B, the stepping deck 612 moves between the retracted position and the deployed position.

Figure 16:
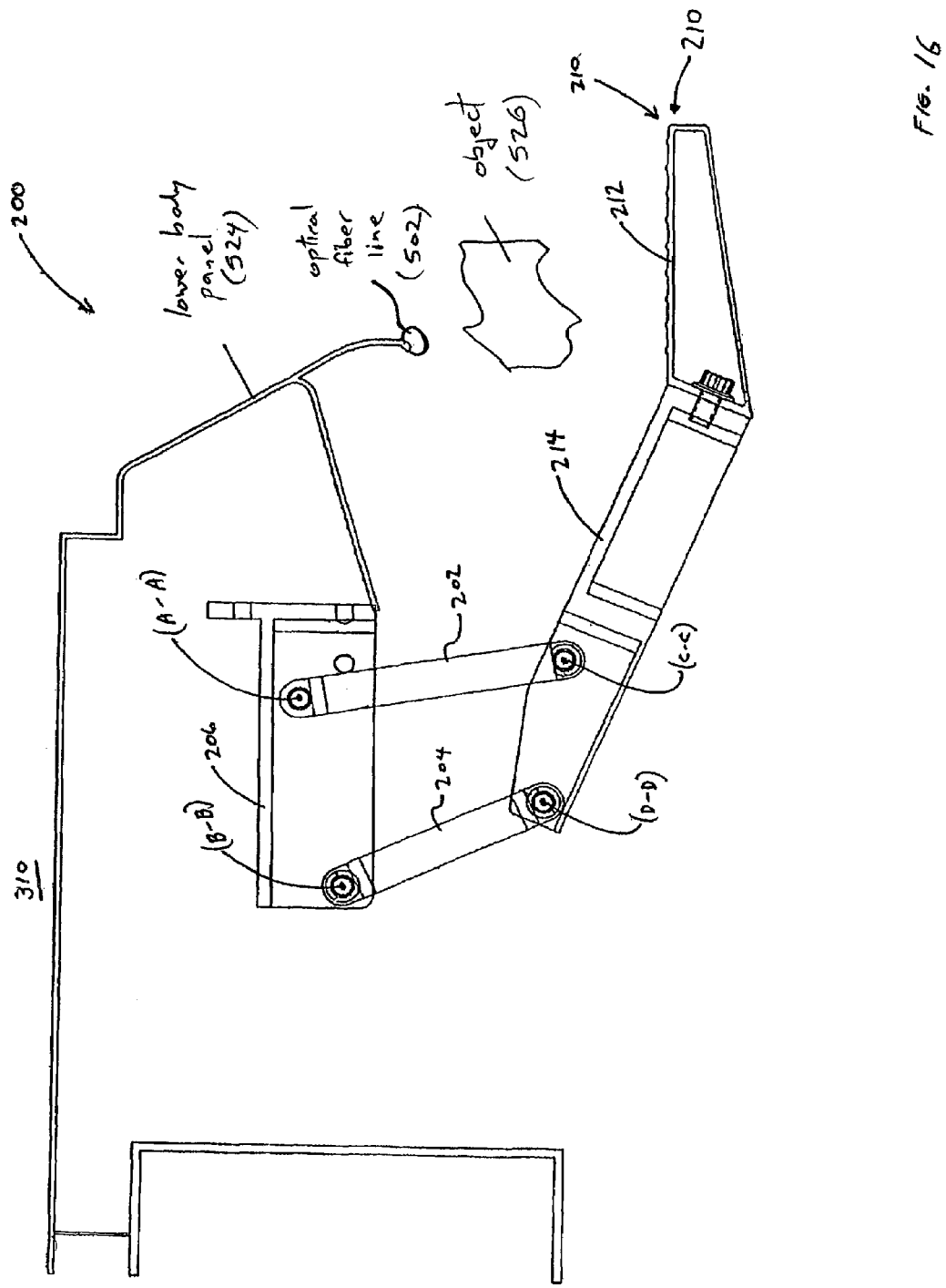
FIG. 16 is a side elevation view of a powered step mechanism of the system of FIG. 15.
Figure 17:
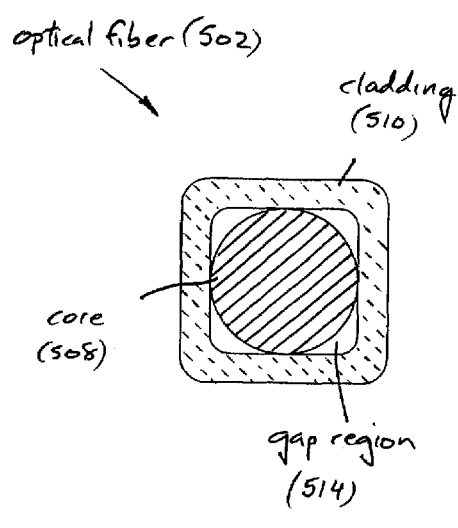
FIG. 17 is another side elevation view of the powered step mechanism of the system of FIG. 15.
Figure 18:
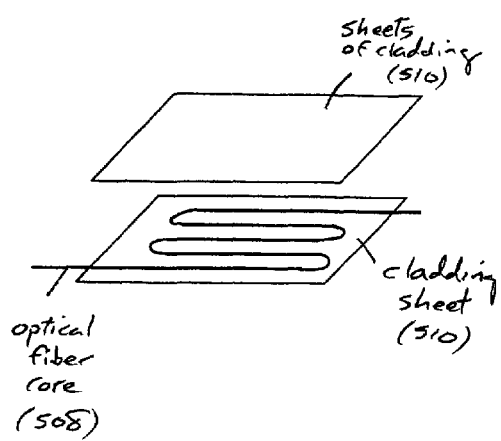
FIG. 18 is an exploded perspective view of the powered step mechanism and a drive system of the retractable vehicle step system of FIG. 15.

FIGS. 16-18 depict the powered step mechanism 600 and the drive system 800 in greater detail. The drive system 800 generally comprises a motor assembly 802 which drives a pinion gear (not shown, but generally similar to the pinion gear 1204 discussed below), which in turn meshes with an output gear 806. The output gear 806 is mounted on and turns an output shaft 808, which drivingly engages the second link 604. Thus, the output gear 806 and output shaft 808 rotate about an output axis which is coincident with the second axis B-B.

The drive system 800 further comprises first and second gearbox halves 820, 822 which join at their respective edges and enclose the pinion and output gears. The output shaft 808 passes through an output opening 824 formed in the gearbox half 822, while a pinion opening 826 accommodates the pinion gear during assembly of the drive system 800.

To secure the motor assembly 802 to the frame 606, a vertical flange 630 and columns 632 are integrally formed as part of the frame 606. A mounting boss 634 is formed at the end of each of the columns 632, and the motor assembly 802 is secured to the columns 632, over the bosses 634, via screws 636. The columns 632 have sufficient length in the lateral direction (i.e. in a direction generally parallel to any of the axes A-A, B-B, C-C, D-D) to provide a lateral space for accommodating the output gear 806 and the gearbox 820, 822 between the motor assembly 802 and the frame 606.

On the vertical flange 630 is also formed a pinion bearing 640 having an inner bore 642. The inner bore 642 is coaxial with the pinion gear and receives an axle stub (not shown, but generally similar to the axle stub 1205 discussed below) which extends laterally from the pinion gear into the inner bore 642. With the axle stub of the pinion gear thus journalled to the pinion bearing 640, the pinion gear is less likely to deflect off-axis under loads or torques imparted by the output gear 806 or the motor assembly 802.

The integral formation of the columns 632, mounting bosses 634 and pinion bearing 640 with the overall frame 606 ensures a very strong, secure connection of the motor assembly 802 (and the drive system 800 in general) to the frame 606. This advantageously minimizes any tendency of the motor assembly to move or flex with respect to the frame as the motor drives the retractable step. This may occur, for example, when sudden or heavier-than-usual loads or torques are transmitted through the output gear 808. Such movement or flexure could result in disengagement of the pinion and output gears and damage to the drive system 800 or retractable step 500.

FIGS. 19-27 depict another embodiment of a retractable vehicle step system 900. The depicted retractable vehicle step system 900 generally comprises a powered step mechanism 1000 and an idler step mechanism 1100, both of which are connected to a stepping deck 912. Under power delivered by a drive system 1200 drivingly connected to the powered step mechanism 1000, the powered and idler mechanisms 1000, 1100 move the stepping deck 912 between a retracted position (e.g., the retracted position RP shown in FIG. 1) and the deployed position depicted in FIG. 19. The deployed position is located downward and outboard of the retracted position.

Figure 19:
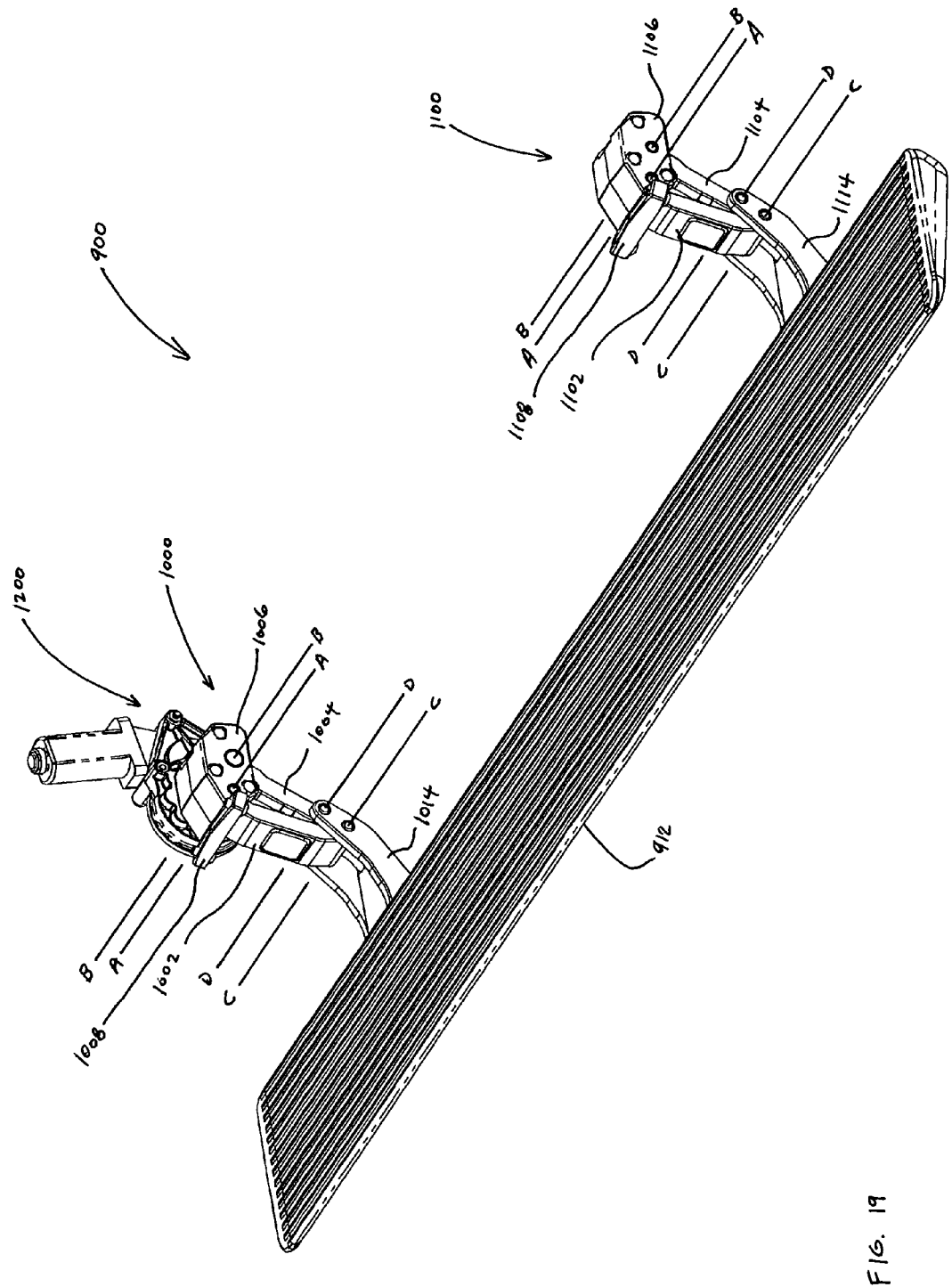
FIG. 19 is a perspective view of another embodiment of a retractable vehicle step system.
Figure 20:
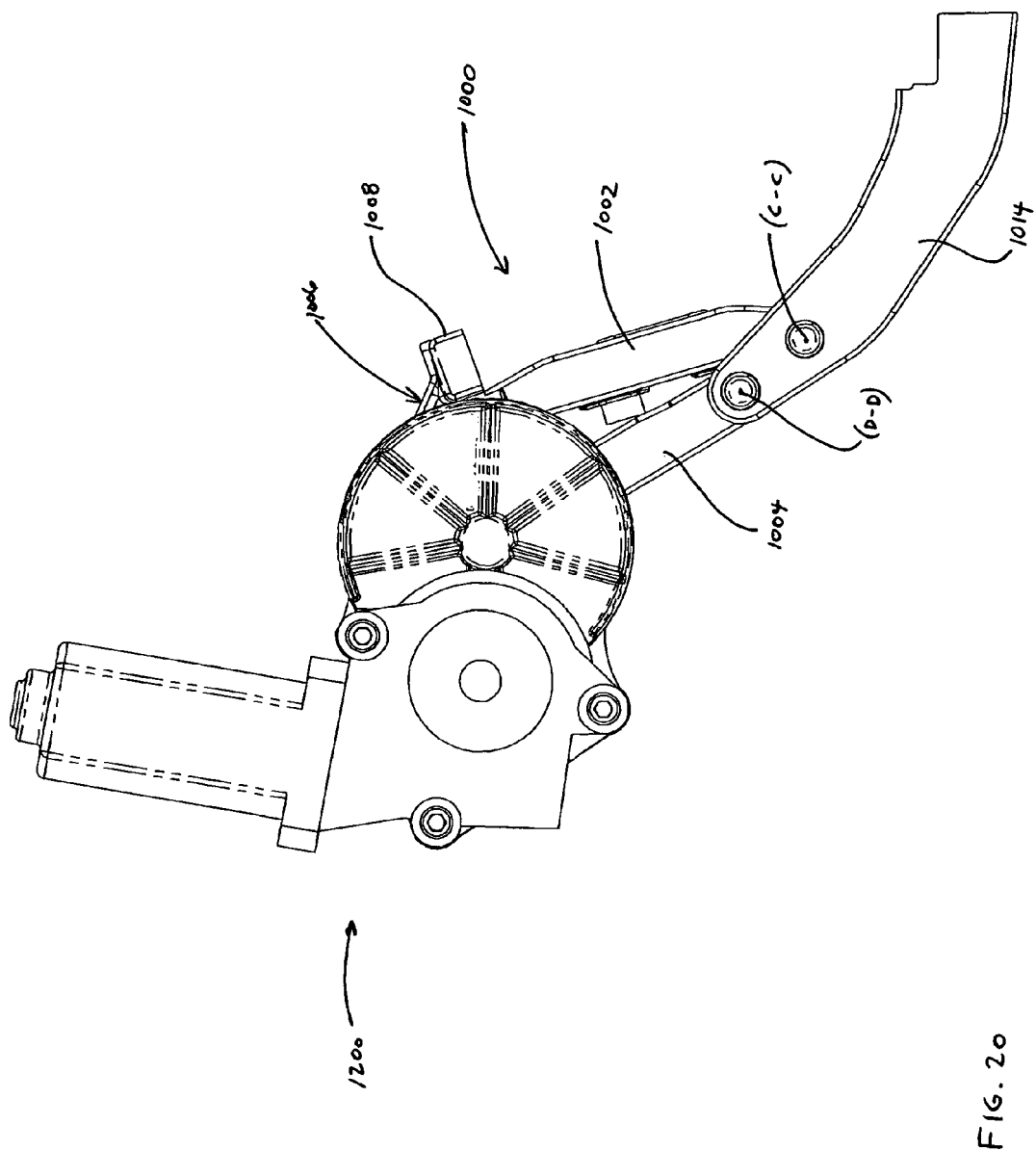
FIG. 20 is a side elevation view of a powered step mechanism and a drive system of the retractable vehicle step system of FIG. 19.
Figure 21:
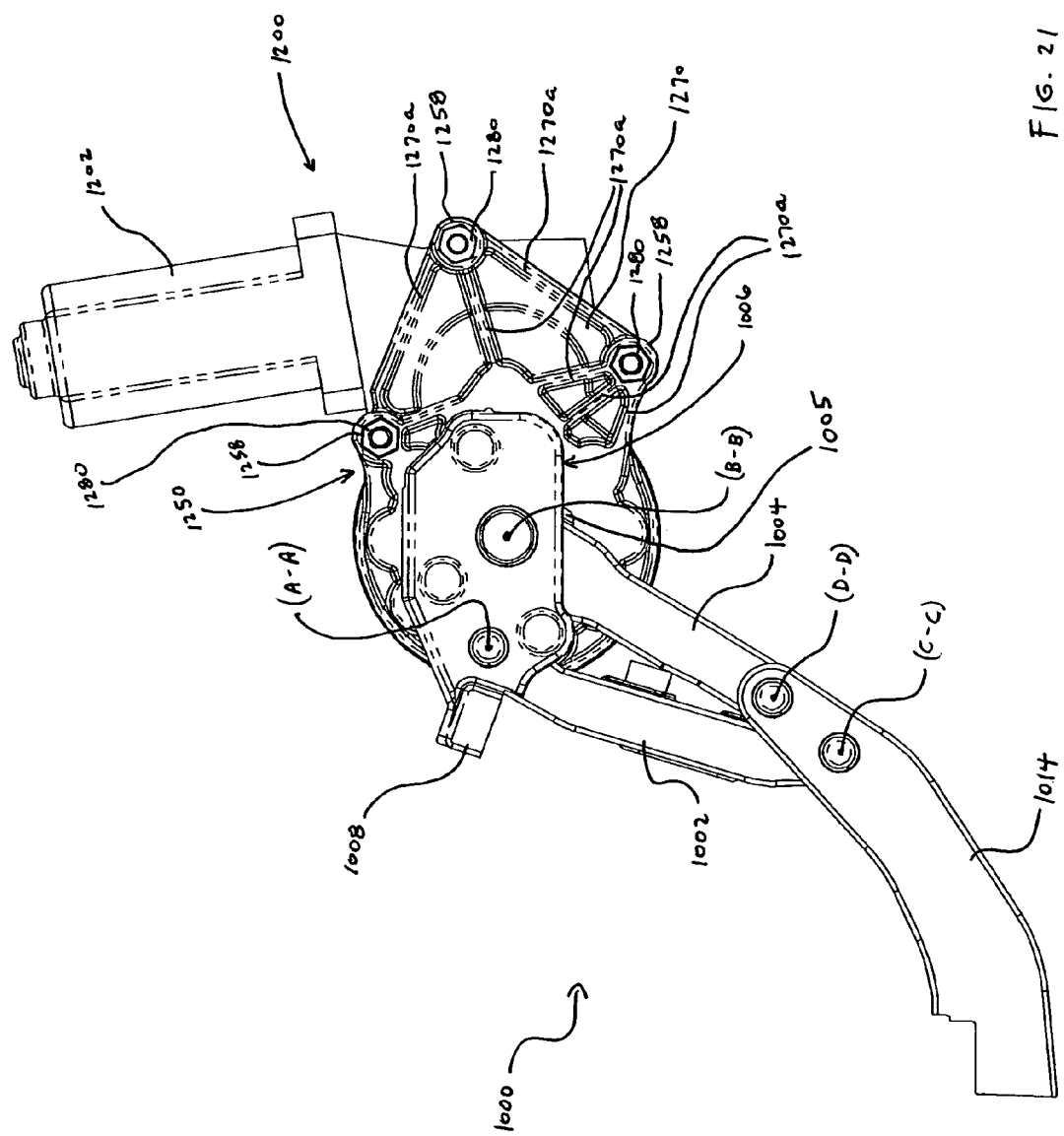
FIG. 21 is another side elevation view of the powered step mechanism and the drive system of the retractable vehicle step system of FIG. 19.
Figure 22:
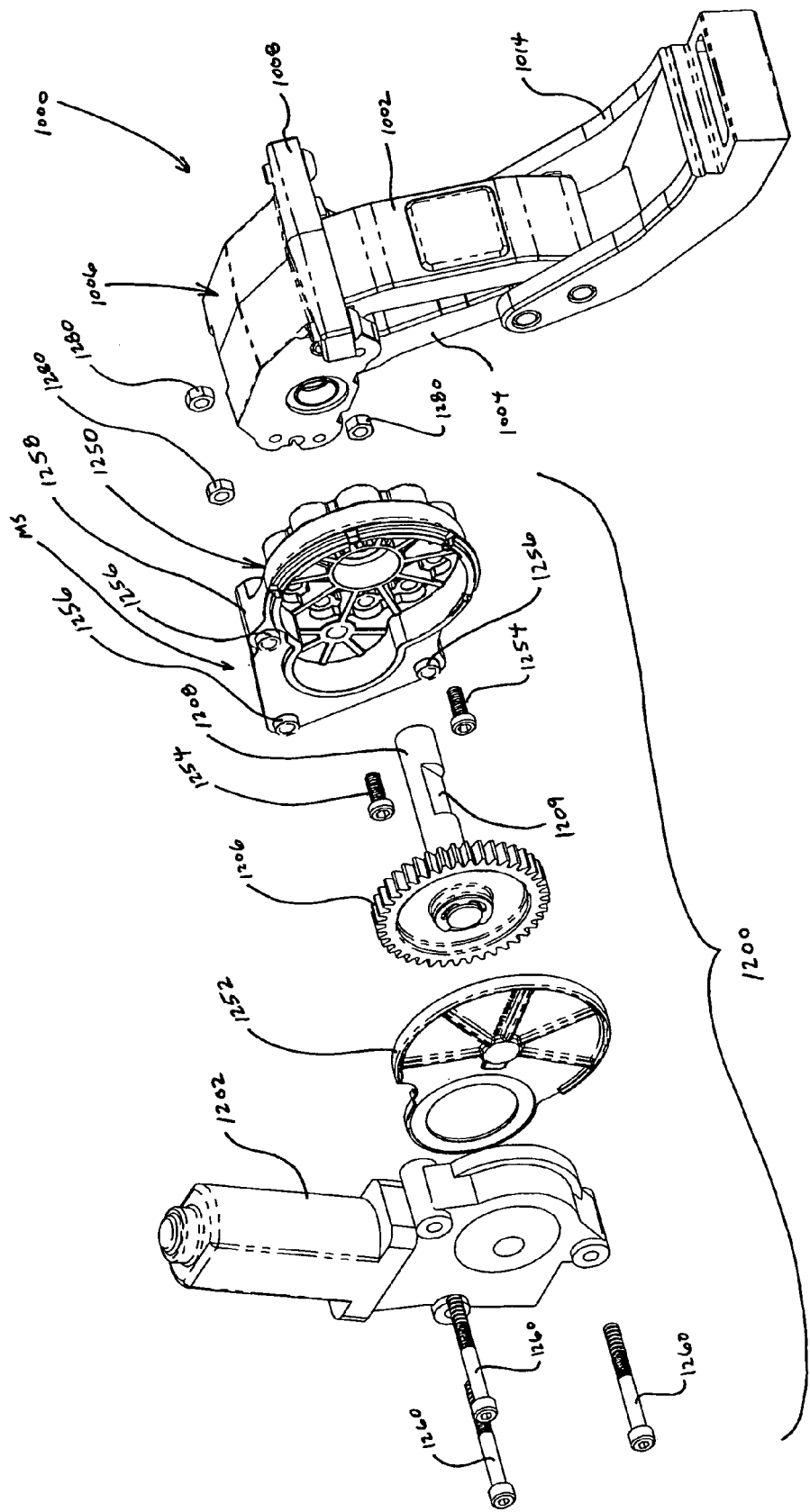
FIG. 22 is an exploded perspective view of the powered step mechanism and the drive system of the retractable vehicle step system of FIG. 19.
Figure 22A:
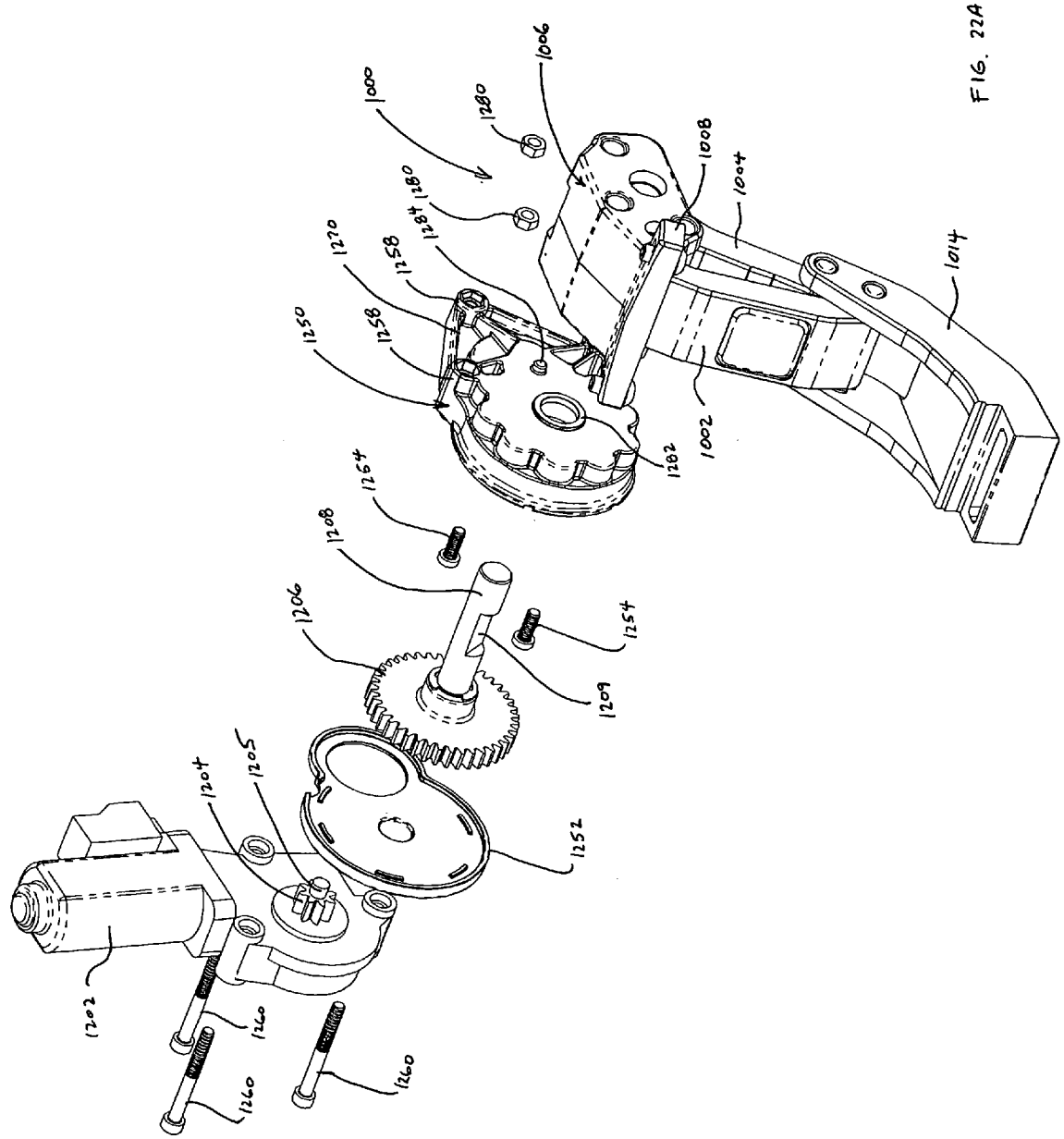
FIG. 22A is another exploded perspective view of the powered step mechanism and the drive system of the retractable vehicle step system of FIG. 19.

In other embodiments, two powered step mechanisms 1000 may be employed in place of the combination of powered and idler mechanisms 1000, 1100 depicted in FIG. 19, or only a single powered step mechanism 1000 (and no idler mechanism 1100 at all) may be employed to support and move the stepping deck 912. In still other embodiments, two or more idler mechanisms 1100 may be employed in combination with one or more powered mechanisms 1000 to support and move the stepping deck 912.

Each of the powered step mechanism 1000 and idler step mechanism 1100 comprises a four-bar linkage which functions in a manner generally similar to the mechanism 200 depicted in FIG. 4. Thus, the powered step mechanism 1000 includes a first arm 1002 and a second arm 1004, each of which is pivotably connected to a generally rigid frame 1006. The frame 1006 is configured to be secured to a vehicle (not shown), particularly the underside thereof, via a mounting flange 1008. The first and second arms 1002, 1004 are therefore pivotable with respect to frame 1006 about generally parallel first and second axes A-A, B-B, respectively. When the retractable vehicle step system 900 is mounted on a vehicle, each of the first and second axes A-A, B-B is oriented generally parallel to the ground. A support bracket 1014 is rigidly connected to the stepping deck 912, and is connected to the first and second arms 1002, 1004 so as to be rotatable about third and fourth axes C-C, D-D, respectively. Thus, upon rotation of the first and second arms 1002, 1004 about the first and second axes A-A, B-B, the stepping deck 912 moves between the retracted position and the deployed position.

Similarly, the idler step mechanism 1100 includes a first arm 1102 and a second arm 1104, each of which is pivotably connected to a generally rigid frame 1106. The frame 1106 is configured to be secured to the vehicle alongside the powered frame 1006 via a mounting flange 1108. The first and second arms 1102, 1104 are therefore pivotable with respect to frame 1106 about the first and second axes A-A, B-B, respectively. A support bracket 1114 is rigidly connected to the stepping deck 912, and is connected to the first and second arms 1102, 1104 so as to be rotatable about the third and fourth axes C-C, D-D, respectively. Thus, upon rotation of the first and second arms 1002, 1004, 1102, 1104 about the first and second axes A-A, B-B, the stepping deck 912 moves between the retracted position and the deployed position.

Either of the powered step mechanism 1000 or the idler step mechanism 1100 may comprise any suitable retractable vehicle step mechanism, of which there are many presently known in the relevant arts. Of course, any suitable later-developed mechanism may also be employed as either of the powered and idler mechanisms 1000, 1100. In some embodiments, either of the powered and idler mechanisms 1000, 1100 may comprise any of the retractable-step mechanisms disclosed in U.S. Pat. No. 6,641,158, issued Nov. 4, 2003, titled RETRACTABLE VEHICLE STEP; or U.S. Patent Application Publication No. US 2003/0184040 A1 (application Ser. No. 10/274,418), published Oct. 2, 2003, titled RETRACTABLE VEHICLE STEP. The entire contents of each of the above-mentioned patent, patent application and publication are hereby incorporated by reference herein and made a part of this specification.

FIGS. 20-22A depict the powered step mechanism 1000 and the drive system 1200 in greater detail. The drive system 1200 generally comprises a motor assembly 1202 which drives a pinion gear 1204, which in turn meshes with an output gear 1206. The output gear 1206 is mounted on and turns an output shaft 1208, which drivingly engages the second link 1004. Thus, the output gear 1206 and output shaft 1208 rotate about an output axis which is coincident with the second axis B-B. Alternatively, the output shaft can drivingly engage the first link 1002, in which circumstance the output gear and output shaft would desirably rotate about an output axis which is coincident with the first axis A-A. The pinion gear 1204 rotates about a pinion axis (not shown) which is generally parallel to the output axis.

In the depicted embodiment, the output shaft 1208 forms a flat 1209 (see FIGS. 22, 22A) that engages a wedge (not shown) in the second link 1004, to facilitate the driving engagement of the second link 1004 by the output shaft 1208. During assembly of this embodiment, the output shaft 1208 is inserted into the second link 1004 and frame 1006. After insertion of the shaft 1208 into the second link 1004 and frame 1006, the wedge of the second link 1004 is drawn against and into engagement with the flat 1209 by turning a set screw 1005 (see FIG. 21) located on the inboard side of the second link 1004.

One suitable type of electric motor assembly 1202 is a standard automotive window-lift motor, such as those available from Siemens AG of Munich, Germany. Such motors are particularly useful because of their ready availability, low cost, low weight and high reliability. Alternatively, any other suitable type of electric motor may be employed, or a pneumatic or hydraulic motor, or a hand crank may be employed to provide power for the drive system 1200.

The drive system 1200 further comprises a motor mount 1250 and a gearbox cover 1252. The motor mount 1250 is removably connected to the frame 1006 via screws 1254, and forms mounting bosses 1256 and columns 1258 which underlie the mounting bosses 1256. The motor assembly 1202 is secured to the columns 1258, over the bosses 1256, via screws 1260.

The motor mount 1250 is shown in greater detail in FIGS. 23-27. In the depicted embodiment, the motor mount 1250 comprises a single, monolithic piece of material, such as molded plastic or cast/forged/machined metal. Thus the mounting bosses 1256 and columns 1258 are interconnected by a generally rigid body 1270. In the embodiment shown in FIGS. 23-27, the body 1270 forms a number of stiffening ribs 1270a which connect the columns 1258 to each other and/or to other portions of the motor mount 1250. In other embodiments, the body 1270 may instead comprise a solid, slab-like member which is not subdivided into individual ribs, or the body may comprise any suitable rigid member having sufficient strength to hold the columns 1258 together when used in a retractable step of the type depicted herein.

The mounting bosses 1256 and the adjacent portions of the body 1270 collectively comprise a motor mounting surface MS of the motor mount 1250. More generally, the motor mounting surface MS comprises those areas of the motor mount 1250 which contact the motor assembly 1202 (whether through direct contact as shown, or through intervening member(s) such as washers, gaskets, seals, etc.) The motor mounting surface of the depicted embodiment is desirably adapted for mounting the depicted motor assembly 1202, which employs three cylindrical connection members which fit over the bosses 1256 and contact the adjacent portions of the body 1270. While this configuration provides a number of advantages, in other embodiments the motor mounting surface may be configured however necessary to fit the motor assembly employed with the motor mount 1250. Accordingly, the motor mounting surface may comprise simply a single flat surface, or a plurality of separate flat surfaces (whether coplanar or non-coplanar), or one or more non-flat surfaces, or any other configuration suitable for use with the selected motor assembly. It will be appreciated, therefore, that the bosses 1256 and columns 1258, and the depicted configuration of the body 1270, are optional, and may be replaced or supplemented in various embodiments by structure suitable for securing the chosen motor assembly 1202 to the motor mount 1250.

The depicted motor mount 1250 also forms a gearbox 1272, and a rim 1274 which surrounds the gearbox 1272. The rim 1274 mates with a corresponding rim 1276 of the gearbox cover 1252 to seal the gearbox 1272 from dust and other contaminants. Although the gearbox 1272 is depicted in FIGS. 23-27 as an integrally-formed part of the motor mount 1250, in other embodiments the gearbox may be provided as a component separate from the motor mount 1250, or omitted altogether.

Figure 24:
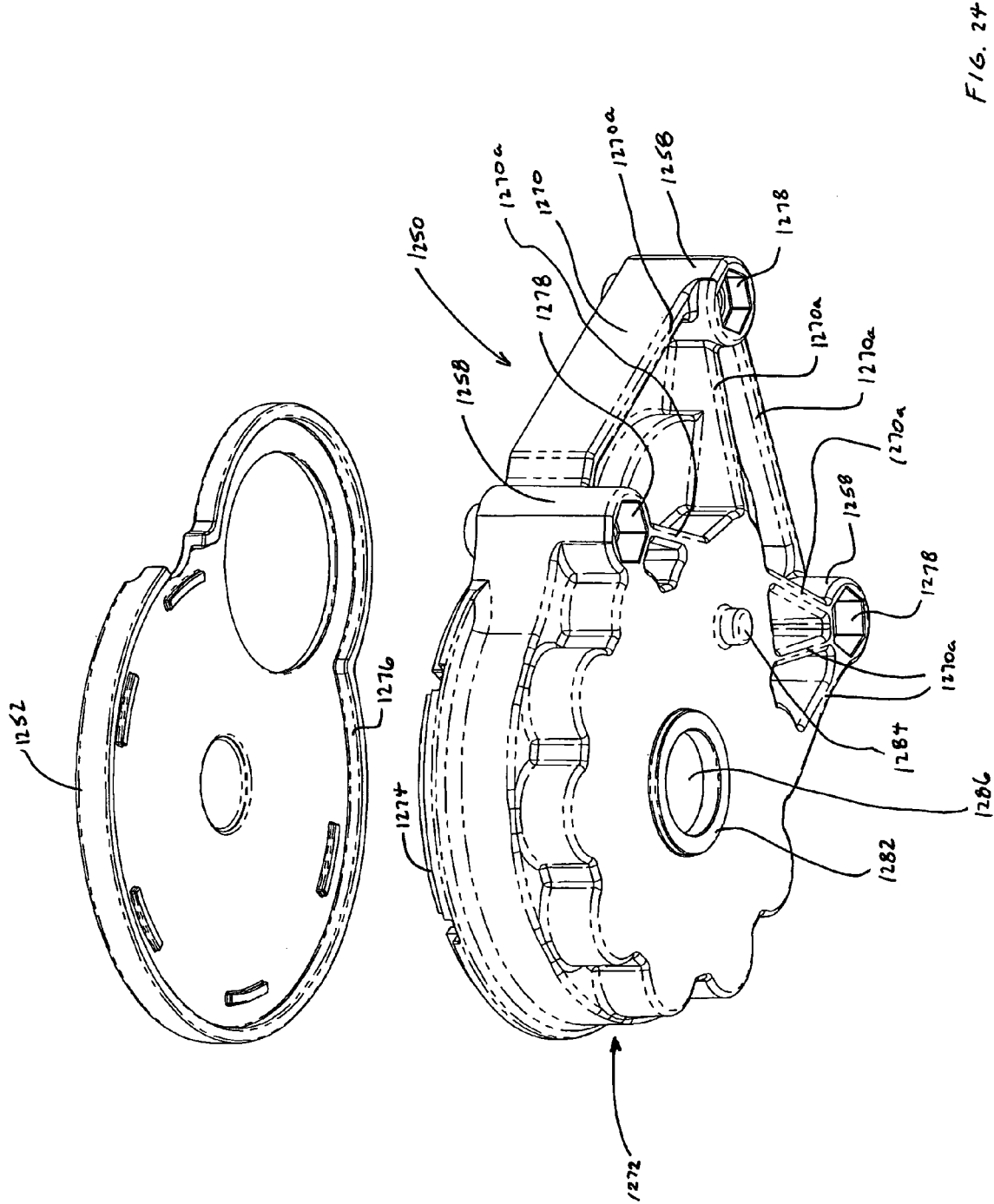
FIG. 24 is another perspective view of the motor mount and gearbox cover of FIG. 23.

As best seen in FIG. 24, each of the columns 1258 may form a hex pocket 1278 for securely receiving a nut 1280 (see FIG. 22) which engages a corresponding screw 1260 to secure the motor assembly 1202 to the motor mount 1250. However, instead of or in addition to the pockets 1278 and nuts 1280, each of the columns 1258 may form a threaded inner bore for threadingly engaging the screws 1260. As shown the motor mount 1250 may also form an alignment rim 1282 and tab 1284 which are configured to engage corresponding depressions (not shown) formed on the frame 1006 and force a desired alignment of the mount 1250 with respect to the frame 1006. The alignment rim 1282 surrounds an output opening 1286 through which the output shaft 1208 passes.

Figure 23:
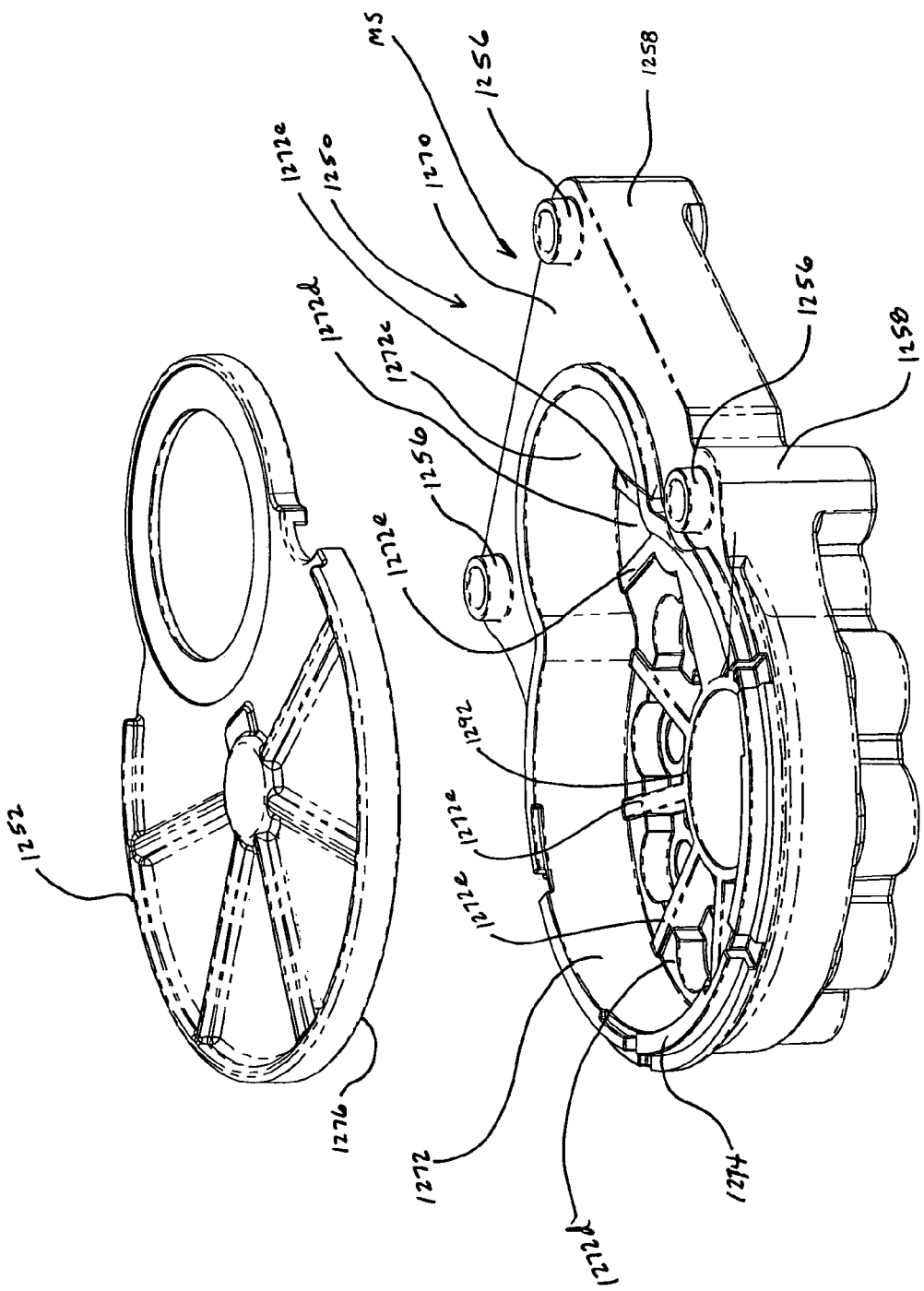
FIG. 23 is a perspective view of a motor mount and gearbox cover usable with the system of FIG. 19.

As best seen in FIGS. 23 and 25, the gearbox 1272 includes a pinion portion 1272a which houses the pinion gear 1204, and an output portion 1272b which houses the output gear 1206. A rigid gearbox wall 1272c surrounds both the pinion and output portions 1272a, 1272b, and extends laterally to an inner surface 1272d of the gearbox 1272.

On the inner surface 1272d of the pinion portion 1272a is formed a pinion bearing 1288 having an inner bore 1290. The inner bore 1290 is coaxial with the pinion gear 1204 and receives an axle stub 1205 which extends laterally from the pinion gear 1204 into the inner bore 1290. With the axle stub 1205 of the pinion gear 1204 thus journalled to the pinion bearing 1288, the pinion gear is less likely to deflect off-axis under loads or torques imparted by the output gear 1206 or the motor assembly 1202. Preferably, a number of stiffening ribs 1272e extend radially outward from the pinion bearing 1288, to the gearbox wall 1272c, and stiffen both the pinion bearing 1288 and the motor mount 1250 in general.

One of the stiffening ribs 1272e extends from the pinion bearing 1288 to an annular inner wall 1292 formed in the inner surface 1272d of the output portion 1272b. Still further stiffening ribs 1272e extend radially outward from the annular inner wall 1292 to the gearbox wall 1272c. Arranged in a circular pattern around the annular inner wall 1292 are a number of thinned circular portions 1272f, any one or more of which may be drilled-out to create an opening for receiving one of the screws 1254 for attaching the motor mount 1250 to the frame 1006.

As best seen in FIGS. 23-24 and 26-27, the motor mount 1250 has sufficient length in the lateral direction (i.e. in a direction generally parallel to any of the axes A-A, B-B, C-C, D-D) to provide a lateral space for accommodating the output gear 1206 and the gearbox 1272 between the motor assembly 1202 and the frame 1006.

Advantageously, the motor mount 1250 facilitates use of a substantially identical component for both the powered frame 1006 and the idler frame 1106 (see FIG. 19). Use of the motor mount 1250 thus eliminates the need to produce one component to serve as the powered frame 1006 and another, different component to serve as the idler frame 1106. Instead, two substantially identical frames can be employed as both the powered frame and the idler frame, with the motor mount 1250 (and the rest of the drive system 1200) connected to the frame designated to serve as the driven frame 1006. The retractable vehicle step system 900 depicted in FIG. 19 is configured in this manner.

Although certain embodiments and examples have been described herein, it will be understood by those skilled in the art that many aspects of the devices shown and described in the present disclosure may be differently combined and/or modified to form still further embodiments. Such alternative embodiments of the devices described above and obvious modifications and equivalents thereof are intended to be within the scope of the present disclosure. Thus, it is intended that the scope of the present invention should not be limited by the particular embodiments described above, but should be determined only by a fair reading of the claims that follow.

What is claimed is:

1. A drive system for use with a retractable vehicle step having (i) a first arm with an upper portion rotatably mountable with respect to an underside of a vehicle so as to be rotatable about a first axis of rotation and (ii) a step member rotatably connected to said first arm so as to be movable in an inboard-outboard direction of movement between a retracted position and an extended position, said first axis being transverse to said inboard-outboard direction of movement, said drive system comprising:
   an electric motor having an armature configured to rotate about an armature axis generally parallel to said first axis;
   a pinion gear drivingly connected with respect to said motor, said pinion gear having a first outside diameter; and
   an output gear in meshing engagement with said pinion gear, said output gear having a second outside diameter;
   wherein said pinion gear and said output gear achieve a gear reduction of at least 3:1, and the larger of said first outside diameter and said second outside diameter is no more than 3.0 times the smaller of said first outside diameter and said second outside diameter.

2. The system of claim 1, wherein said output gear is configured to rotate about said first axis.

3. The system of claim 1, wherein said pinion gear is configured to rotate about a pinion axis generally parallel to said inboard-outboard direction of movement.

4. The system of claim 1, wherein said output gear comprises a helical gear.

5. The system of claim 1, wherein the larger of said first outside diameter and said second outside diameter is no more than 2.0 times the smaller of said first outside diameter and said second outside diameter.

6. The system of claim 1, wherein the larger of said first outside diameter and said second outside diameter is no more than 1.5 times the smaller of said first outside diameter and said second outside diameter.

7. The system of claim 1, wherein the larger of said first outside diameter and said second outside diameter is no more than 1.2 times the smaller of said first outside diameter and said second outside diameter.

8. The system of claim 1, wherein the larger of said first outside diameter and said second outside diameter is no more than 1.1 times the smaller of said first outside diameter and said second outside diameter.

9. The system of claim 1, wherein said output gear and said pinion gear achieve a gear reduction of at least 5:1.

10. The system of claim 1, further comprising an output shaft on which said output gear is mounted, and a tolerance ring coupling said output gear to said output shaft.

11. The system of claim 3, wherein said armature axis is located inboard of said first axis.

12. A drive system for use with a retractable vehicle step configured to be associated with an outboard edge of a vehicle, said step having a lateral axis oriented generally parallel to said outboard edge, said drive system comprising:
   an electric motor having an armature configured to rotate about an armature axis;
   a pinion gear drivingly connected with respect to said motor, said pinion gear having a first outside diameter;
   an output gear in meshing engagement with said pinion gear, said output gear having a second outside diameter; and
   an output shaft having a drive end configured for driving engagement with said retractable vehicle step, said output gear mounted on said output shaft, said output shaft configured to rotate about an output shaft axis generally parallel to said armature axis and said lateral axis;
   wherein said pinion gear and said output gear achieve a gear reduction of at least 3:1, and the larger of said first outside diameter and said second outside diameter is no more than 3.0 times the smaller of said first outside diameter and said second outside diameter.

13. The drive system of claim 12, wherein the larger of said first outside diameter and said second outside diameter is no more than 2.0 times the smaller of said first outside diameter and said second outside diameter.

14. The drive system of claim 12, wherein the larger of said first outside diameter and said second outside diameter is no more than 1.5 times the smaller of said first outside diameter and said second outside diameter.

15. The drive system of claim 12, wherein the larger of said first outside diameter and said second outside diameter is no more than 1.2 times the smaller of said first outside diameter and said second outside diameter.

16. The drive system of claim 12, wherein the larger of said first outside diameter and said second outside diameter is no more than 1.1 times the smaller of said first outside diameter and said second outside diameter.

17. The drive system of claim 12, wherein said pinion gear and said output gear achieve a gear reduction of at least 5:1.

18. The drive system of claim 12, further comprising a retractable vehicle step drivingly connected with respect to said output shaft.

19. A drive system for use with a retractable vehicle step having (i) a first arm with an upper portion rotatably mountable with respect to an underside of a vehicle so as to be rotatable about a first axis of rotation and (ii) a step member rotatably connected to said first arm so as to be movable in an inboard-outboard direction of movement between a retracted position and an extended position, said first axis being transverse to said inboard-outboard direction of movement, said drive system comprising:
  an electric motor having an armature configured to rotate about an armature axis generally parallel to said first axis;
  a pinion gear drivingly connected with respect to said motor;
  an output gear in meshing engagement with said pinion gear; and
  an output shaft having a drive end configured for driving engagement with said retractable vehicle step, said output gear mounted on said output shaft, said output shaft configured to rotate about an output shaft axis; and
  a breakaway member connecting said output gear to said output shaft, said breakaway member preventing relative angular motion of said output gear and said output shaft, except in response to application of a breakaway torque to one of said output gear and said output shaft.

20. The drive system of claim 19, wherein said breakaway member comprises a cylindrical spring member.

21. The drive system of claim 19, wherein said breakaway member comprises a tolerance ring.

22. The drive system of claim 20, wherein said spring member is positioned between an outside diameter of said output shaft and an inside diameter of said output gear.

23. The drive system of claim 20, wherein said spring member forms a number of ridges extending generally parallel to said output shaft axis.

24. The drive system of claim 23, wherein at least one of said ridges forms an apex which bears against one of an outside diameter of said output shaft and an inside diameter of said output gear.

25. A drive system for use with a retractable vehicle step having (i) a first arm with an upper portion rotatably mountable with respect to an underside of a vehicle so as to be rotatable about a first axis of rotation oriented generally parallel to the ground and (ii) a step member rotatably connected to said first arm so as to be movable generally along an inboard-outboard axis between a retracted position and an extended position, said drive system comprising:
  an electric motor having an armature configured to rotate about an armature axis generally parallel to said first axis;
  a pinion gear drivingly connected with respect to said motor, said pinion gear having a first outside diameter; and
  an output gear in meshing engagement with said pinion gear, said output gear having a second outside diameter;
  wherein said pinion gear and said output gear achieve a gear reduction of at least 3:1, and the larger of said first outside diameter and said second outside diameter is no more than 3.0 times the smaller of said first outside diameter and said second outside diameter and wherein said pinion gear and said output gear comprise crossed helical gears.

26. The system of claim 25, wherein said pinion gear has a helix angle of about 75 degrees, and said output gear has a helix angle of about 15 degrees.

27. The system of claim 25, wherein said output gear is configured to rotate about said first axis.

28. The system of claim 25, wherein said pinion gear is configured to rotate about a pinion axis generally parallel to said inboard-outboard axis.

29. The system of claim 25, wherein the larger of said first outside diameter and said second outside diameter is no more than 2.0 times the smaller of said first outside diameter and said second outside diameter.

30. The system of claim 25, wherein the larger of said first outside diameter and said second outside diameter is no more than 1.5 times the smaller of said first outside diameter and said second outside diameter.

31. The system of claim 25, wherein the larger of said first outside diameter and said second outside diameter is no more than 1.2 times the smaller of said first outside diameter and said second outside diameter.

32. The system of claim 25, wherein the larger of said first outside diameter and said second outside diameter is no more than 1.1 times the smaller of said first outside diameter and said second outside diameter.

33. The system of claim 25, wherein said output gear and said pinion gear achieve a gear reduction of at least 5:1.

34. The system of claim 25, further comprising an output shaft on which said output gear is mounted, and a tolerance ring coupling said output gear to said output shaft.

35. The system of claim 28, wherein said armature axis is located inboard of said first axis.

* * * * *